US008917668B1

(12) United States Patent
Song et al.

(10) Patent No.: US 8,917,668 B1
(45) Date of Patent: Dec. 23, 2014

(54) SYSTEM AND METHOD FOR ENERGY SAVING IN A WIRELESS SYSTEM

(71) Applicant: Research In Motion Limited, Waterloo (CA)

(72) Inventors: Yi Song, Plano, TX (US); Chandra Sekhar Bontu, Nepean (CA); Zhijun Cai, Hedron, VA (US); Rene Waraputra Purnadi, Irving, TX (US)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/911,926

(22) Filed: Jun. 6, 2013

(51) Int. Cl.
 H04W 4/00 (2009.01)
 H04W 52/02 (2009.01)
 H04W 36/00 (2009.01)
(52) U.S. Cl.
 CPC ...... *H04W 52/0206* (2013.01); *H04W 36/0072* (2013.01)
 USPC ........................................ 370/328; 455/422.1
(58) Field of Classification Search
 CPC combination set(s) only.
 See application file for complete search history.

(56) References Cited

U.S. PATENT DOCUMENTS

| 8,489,087 | B2* | 7/2013 | Nam et al. ................. 455/423 |
| 2004/0106431 | A1* | 6/2004 | Laroia et al. ............... 455/552.1 |
| 2008/0064361 | A1 | 3/2008 | Bjork et al. |
| 2008/0207230 | A1* | 8/2008 | Jung et al. ................. 455/458 |
| 2009/0290561 | A1 | 11/2009 | Kleindl |
| 2010/0009694 | A1 | 1/2010 | Fischer |
| 2011/0244870 | A1* | 10/2011 | Lee .......................... 455/444 |
| 2012/0094654 | A1* | 4/2012 | Kim et al. .................. 455/422.1 |
| 2012/0113882 | A1 | 5/2012 | Zhao et al. |
| 2012/0163295 | A1* | 6/2012 | Park et al. .................. 370/328 |

FOREIGN PATENT DOCUMENTS

| EP | 2141947 A1 | 1/2010 |
| EP | 2568740 A1 | 3/2013 |

OTHER PUBLICATIONS

Catt: "The solution for the compensation scenario", 3GPP Draft; R3-110075, 3rd Generation Partnership Project (3GPP), Mobile Competence Centre; 650, Route des Lucioles; F-06921 Sophia-Antipolis Cedex; France, vol. RAN WG3, no. Dublin, Ireland; 20110117, Jan. 11, 2014, XP050497115, [retrieved on Jan. 11, 2011] figure 2, paragraph [02.3].
Catt: "The solution for the compensation scenario", 3GPP Draft, R3-120512, 3rd Generation Partnership Project (3GPP), Mobile Competence Centre; 650, Route des Lucioles; F-06921 Sophia-Antipolis Cedex; France, Apr. 2, 2012, XP050668877, Retrieved from the Internet: URL: http://www.3gpp.org/ftp/tsg_ranWG3_lu/TSGR3_75bis/Docs/ [retrieved on Apr. 2, 2012] figure 2, paragraph [02.2] .
International Search Report mailed Aug. 8, 2014 of corresponding PCT Patent application No. PCT/US2014/040928 filed Jun. 4, 2014.

\* cited by examiner

*Primary Examiner* — Clemence Han
(74) *Attorney, Agent, or Firm* — Perry + Currier Inc.

(57) ABSTRACT

A system and method for entering and exiting energy savings power mode in a wireless network is provided. According to an aspect, a request message for requesting entry of a node into energy serving is generated at an anchor node. The request message is sent and the node that receives it enters an energy saving mode. The request can be implemented as an X2-application protocol message and can include indicators for timing of entry into energy saving mode, resources to be reserved and the state of energy saving mode to be entered into. The nodes can take the form of anchor nodes and non-anchor nodes as well as macro nodes and small nodes. Modified versions of X2-application protocol messages eNB configuration update, cell activation request and cell activation response can also be used to assist a node in entering and exiting energy savings power mode.

60 Claims, 15 Drawing Sheets

SYSTEM AND METHOD FOR ENERGY SAVING IN A WIRELESS SYSTEM

FIELD OF INVENTION

The present disclosure relates generally to wireless systems, and more particularly to energy saving in a wireless system.

BACKGROUND

As wireless network system usage grows, more and more network nodes are added to the system to allow coping with the increased traffic demands, and to help ensure uniform coverage. Accordingly, power consumption and co-channel interference associated with a wireless system has been growing. It is prudent to enable or disable these network nodes based on the need to contain network power consumption and co-channel interference. According to the LTE standard [TR36.927, Potential solutions for energy saving for E-UTRAN] some network nodes can be powered down to reduce power consumption as well as to reduce interference in the system when the system senses low traffic. In power down mode, a network node is still operational to send and receive backhaul messages. However, all or most of its over-the-air transmission and reception functionality is turned off.

DETAILED DESCRIPTION

Figure 1:
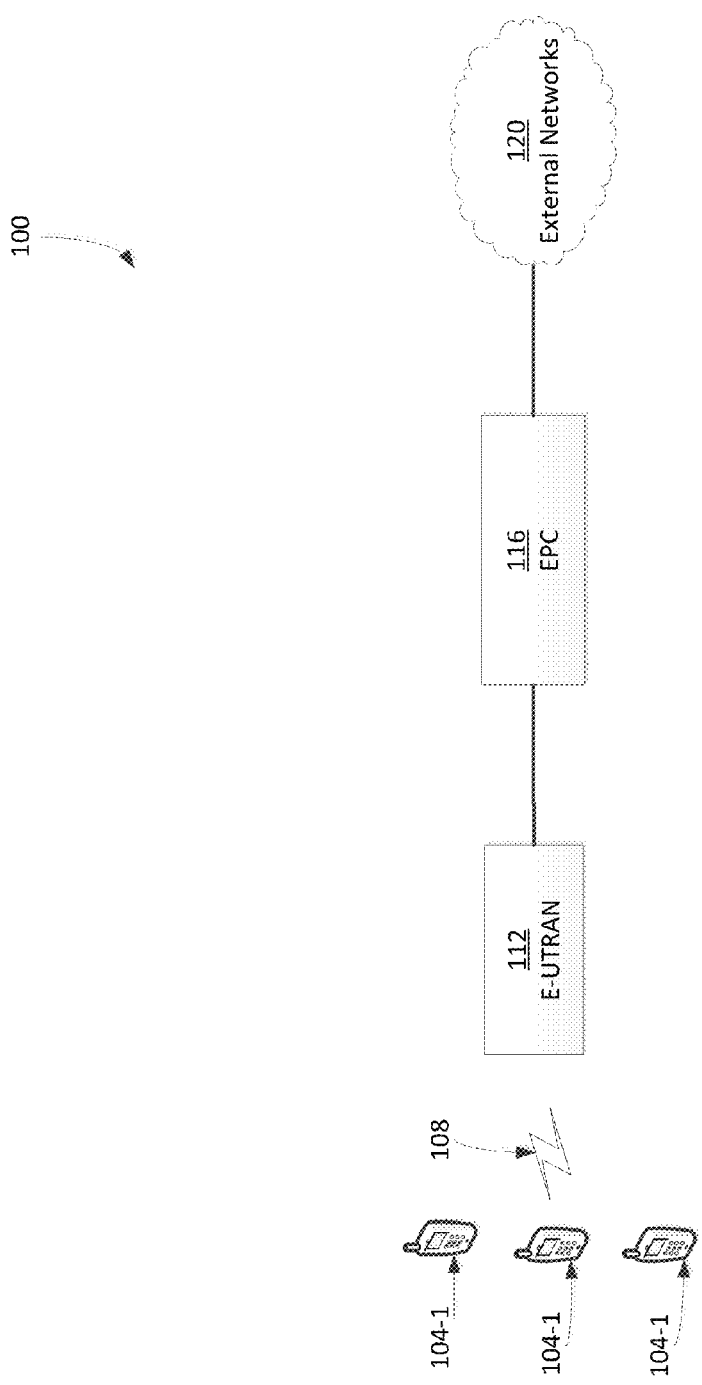
FIG. 1 shows a block diagram of an aspect of a wireless system for energy saving.

According to an aspect, a method performed at a network node for entering the network node into an energy saving mode is provided. The method can comprise:

receiving a request message from an anchor node requesting entry of the network node into said energy saving mode;
sending an acknowledgement message in response to the request message; and
entering the energy saving mode.

Entering the energy saving mode can comprise putting the network node into an energy saving mode state, the energy saving mode state being one of: reception off and transmission on state; reception on and transmission off state; or reception off and transmission off state. Putting the network node into reception on transmission off state further can comprise receiving signals transmitted by a user equipment (UE) associated with the anchor node, the signals being specific to the UE. Putting the network node into reception off transmission on state can further comprise broadcasting network node specific signals at regular intervals.

The request message can include at least one of an indication of time of entry of an anchor node into anchor mode or an indication of an energy saving mode state. The request message can also include an indication of radio resources to be reserved and the method can further comprise:
scheduling user equipment served by the network node on the indicated reserved resources prior to user equipment handover.
The method can further comprise:
receiving, prior to the entering, an X2-Application Protocol message indicating an adjustment of transmission parameters of the anchor node.
The transmission parameters comprise at least one of transmission power level, antenna type or antenna tilt. The X2-Application Protocol message can be an eNB Configuration Update message modified to include an indicator for transmission parameters.
The method can further comprise:
sending, after the entering, an X2-Application Protocol message indicating an adjusted transmission parameter of the network node.
The X2-Application Protocol message can be an eNB Configuration Update message modified to include an indicator for transmission parameters.
The method of claim can further comprise:
providing an identifier of the anchor node to a user equipment served by the network node.
The method can further comprise:
transferring to the anchor node contexts for user equipment served by the network node.
The method can further comprise:
obtaining anchor node information from one or more of Operations, Administration and Management (OAM) or Self-Organized Network (SON).

According to an aspect a second method performed at a network node for exiting an energy saving mode is provided. The second method can comprise:
receiving a request message to exit the energy saving mode;
responsive to the receiving, exiting the energy saving mode; and
generating an acknowledgement message in response to the request message,
wherein the request message can include one or more of an indication of time of adjusting transmission parameters at an anchor node, an indication of resources to be reserved, or an indication of the energy saving mode state.
The second method can further comprise:
receiving an X2-Application Protocol message indicating the adjusted transmission parameters of an anchor node.

The X2-Application Protocol message can be an eNB Configuration Update message modified to include an indicator for transmission parameters.

According to an aspect a third method performed at an anchor node for increasing a cell area served by the anchor node is provided. The third method can comprise:

sending a request message to a network node requesting the network node enter into an energy saving mode;
receiving an acknowledgement message in response to the request message; and
adjusting transmission parameters to increase the cell area.

The request message can include at least one of an indication of time of adjusting transmission parameters, an indication of resources to be reserved or an indication of the energy saving mode state.

The third method can further comprise:
sending, after the entering, an X2-Application Protocol message indicating the adjusted transmission parameters.

The X2-Application Protocol message can be an eNB Configuration Update message modified to include an indicator for adjusted transmission parameters.

The third method can further comprise:
receiving, after the adjusting, an X2-Application Protocol message indicating adjusted network node transmission parameters of the network node.

The X2-Application Protocol message can be an eNB Configuration Update message modified to include an indicator for adjusted network node transmission parameters. The transmission parameters can comprise at least one of transmission power level, antenna type or antenna tilt.

According to an aspect, a fourth method performed at an anchor node for decreasing a cell area served by the anchor node is provided. The fourth method can comprise:

sending a request message to a network node requesting the network node exit from an energy saving mode;
receiving an acknowledgement message in response to the request message; and
adjusting transmission parameters to decrease the cell area.

The request message can include at least one of an indication of time of adjusting the transmission parameters or an indication of the energy saving mode state.

The request message can include an indication of resources to be reserved and the fourth method can further comprise:
scheduling user equipment served by the anchor node on the indicated reserved resources prior to user equipment handover.

The fourth method can further comprise:
sending, after the exiting, an X2-Application Protocol message indicating the adjusted transmission parameters at the anchor node.

The X2-Application Protocol message can be an eNB Configuration Update message modified to include an indicator for the adjusted transmission parameters. The transmission parameters can comprise at least one of transmission power level, antenna type or antenna tilt.

According to an aspect, a fifth method performed at a network node for entering into an energy saving mode is provided. The fifth method can comprise:

sending a request message for requesting support for entry into the energy saving mode;
receiving an acknowledgement message in response to the request message; and
entering the energy saving mode.

The energy saving mode can comprise putting the network node into an energy saving mode state, the energy saving mode state being one of: reception off and transmission on state; reception on and transmission off state; or reception off and transmission off state. The acknowledgement message can include at least one of an indication of time of adjusting transmission parameters at an anchor node to increase a cell area served by the anchor node or an indication of the energy saving mode state.

The acknowledgement message can include an indication of radio resources to be reserved and the fifth method can further comprise:
scheduling user equipment served by the network node on the indicated reserved resources prior to handover.

The fifth method can further comprise:
receiving, prior to the entering, an X2-Application Protocol message indicating adjusted transmission parameters of an anchor node.

The X2-Application Protocol message can be an eNB Configuration Update message modified to include the adjusted transmission parameters.

The fifth method can further comprise:
sending, after the entering, an X2-Application Protocol message indicating adjusted transmission parameters of the network node.

The X2-Application Protocol message can be an eNB Configuration Update message modified to include the adjusted transmission parameters.

According to an aspect a sixth method performed at an anchor node for increasing a cell area served by the anchor node is provided. The sixth method can comprise:

receiving a request message from a network node requesting support for the network node to enter into an energy saving mode;
sending an acknowledgement message in response to the request message; and
adjusting transmission parameters to increase the cell area.

The acknowledgement message can include at least one of an indication of time of adjusting the transmission parameters, an indication of resources to be reserved or an indication of the energy saving mode state.

The sixth method can further comprise:
sending, after the entering, an X2-Application Protocol message indicating the adjusted transmission parameters level.

The X2-Application Protocol message can be an eNB Configuration Update message modified to include an indicator for the transmission parameters.

The sixth method can further comprise:
receiving, after the entering, an X2-Application Protocol message indicating adjusted network node transmission parameters of the network node.

The X2-Application Protocol message can be an eNB Configuration Update message modified to include an indicator for the transmission parameters. The transmission parameters can comprise at least one of transmission power level, antenna type or antenna tilt.

According to an aspect, a seventh method performed at a user equipment is provided. The method can comprise:

receiving from a network node a message including an identifier of an anchor node;
prioritizing connecting with the anchor node during RLF recovery after the anchor node enters an increased transmission level.

The message can be in accordance with radio resource control protocol.

The seventh method can further comprise:
measuring signal quality of the anchor node.

The seventh method can further comprise:
receiving a second message indicating reserved resources; and
receiving instructions to move to the reserved resources prior to handover.

According to an aspect an eighth method performed at a network node for exiting an energy saving mode is provided. The eighth method can comprise:
maintaining the energy saving mode having a first energy saving mode state;
receiving a request message including an indication of a second energy saving mode state; and
entering into the second energy saving mode state in response to the request message.

The request message can be an X2-Application Protocol message. The request message can further indicate measuring a reference signal transmitted by user equipment. The indication of measuring a reference signal can include one or more of a configuration of the reference signal, a configuration of measuring the reference signal, or triggering criteria of reporting measurement results.

The eighth method can further comprise measuring the reference signal.

The eighth method can further comprise sending a response message in response to the request message, where the response message can be an X2-Application Protocol message and can include results of performing the measuring. The request message can further indicate transmitting low density discovery signals.

The eighth method can further comprise sending a response message in response to the request message, where the response message can be an X2-Application Protocol message. The request message further indicates configuration of the low density discovery signal.

The first energy saving mode state can be reception off and transmission off state and the second energy saving mode state can be reception on and transmission off state.

According to an aspect a ninth method performed at an anchor node for requesting an energy saving mode exit at a network node is provided. The ninth method can comprise:
sending a request message including an indication to change energy saving mode state at the network mode; and
receiving response to the request.

The request message can be an X2-Application Protocol message. The request message can further indicate measuring at the network node, an uplink signal transmitted by a user equipment and the ninth method can further comprise:
sending an instructing message to a user equipment to transmit the uplink signal based on a configuration.

The configuration can include one or more of parameters for signal generation, time duration and periodicity of signal transmission, uplink radio resources for transmitting the signal, or transmission power.

The ninth method can further comprise receiving a response message in response to the request message and the response message can be an X2-Application Protocol message and can include results of performing the measuring. The request message can further indicate transmitting a low density discovery signal.

The ninth method can further comprise:
sending an instructing message to a user equipment for measuring the discovery signal; and
receiving from the user equipment an identifier of the network node identified based on results of performing the measuring.

The ninth method can further comprise:
sending a second request message to the network node requesting exiting the energy saving mode at the network node.

The ninth method can further comprise:
receiving from the user equipment an identifier of a second network node identified based on the measuring; and
determining which network node to handover the user equipment.

A tenth method performed at a user equipment is provided. The tenth method can comprise:
receiving from an anchor node an instructing message to transmit an uplink signal based on a configuration; and
transmitting the uplink signal.

The configuration can include one or more of parameters for signal generation, time duration and periodicity of signal transmission, uplink radio resources for transmitting the signal, or transmission power. The message can be in accordance with one or more of a radio resource control protocol or a system information block (SIB).

An eleventh method performed at a user equipment comprising:
receiving from an anchor node an instructing message for measuring a discovery signal;
measuring the discovery signal; and
reporting the measurements to the anchor cell.

The instructing message can include at least one of measurement configuration indicating how to perform the measuring or reporting configuration indicating how to report measurement results. The measurement configuration can include one or more of the quantity to measure, or filtering parameters. The reporting configuration can include one or more of the quantity to report or the threshold to trigger reporting of measurement results. The instructing message can include signal configuration of the discovery signal. The message can be in accordance with one or more of a radio resource control protocol or a system information block (SIB).

The eleventh method can further comprise:
identifying at least one network node identifier based on the measuring; and
sending the at least one identifier to the anchor node.

The sending can further include one or more measurement results corresponding to the at least one identifier.

FIG. 1 depicts a block diagram in accordance with an aspect of a wireless system for energy saving. In this exemplary implementation the wireless system 100 may be configured in accordance with the 3GPP Long Term Evolution (LTE) standards as defined for example in TR36.300 v11.5.0. New standards are still being defined however, and it is expected that they will have similarities to the system behavior described herein, and it will also be understood by persons skilled in the art that the system and various system components described herein are intended to use any other suitable standards that are developed in the future.

Wireless system 100 includes a user equipment (UE) 104-1, 104-2 and 104-3, which in the present example is based on the computing environment and functionality of a hand-held wireless communication device. Collectively, UE 104-1, 104-2 and 104-3 are referred to as UEs 104, and generically as UE 104. This nomenclature is used elsewhere herein. A UE 104 is not limited to a hand-held wireless communication device, however. Other devices are also contemplated, such as cellular telephones, smart telephones, routers, Personal Digital Assistants (PDAs), media (e.g. MP3) players, laptop computers, tablet computers and the like. In other examples, UE 104 can be a computing device such as a desktop computer, an embedded computer or other computing device that includes appropriate communications interface for communicating with a wireless system.

Figure 2:
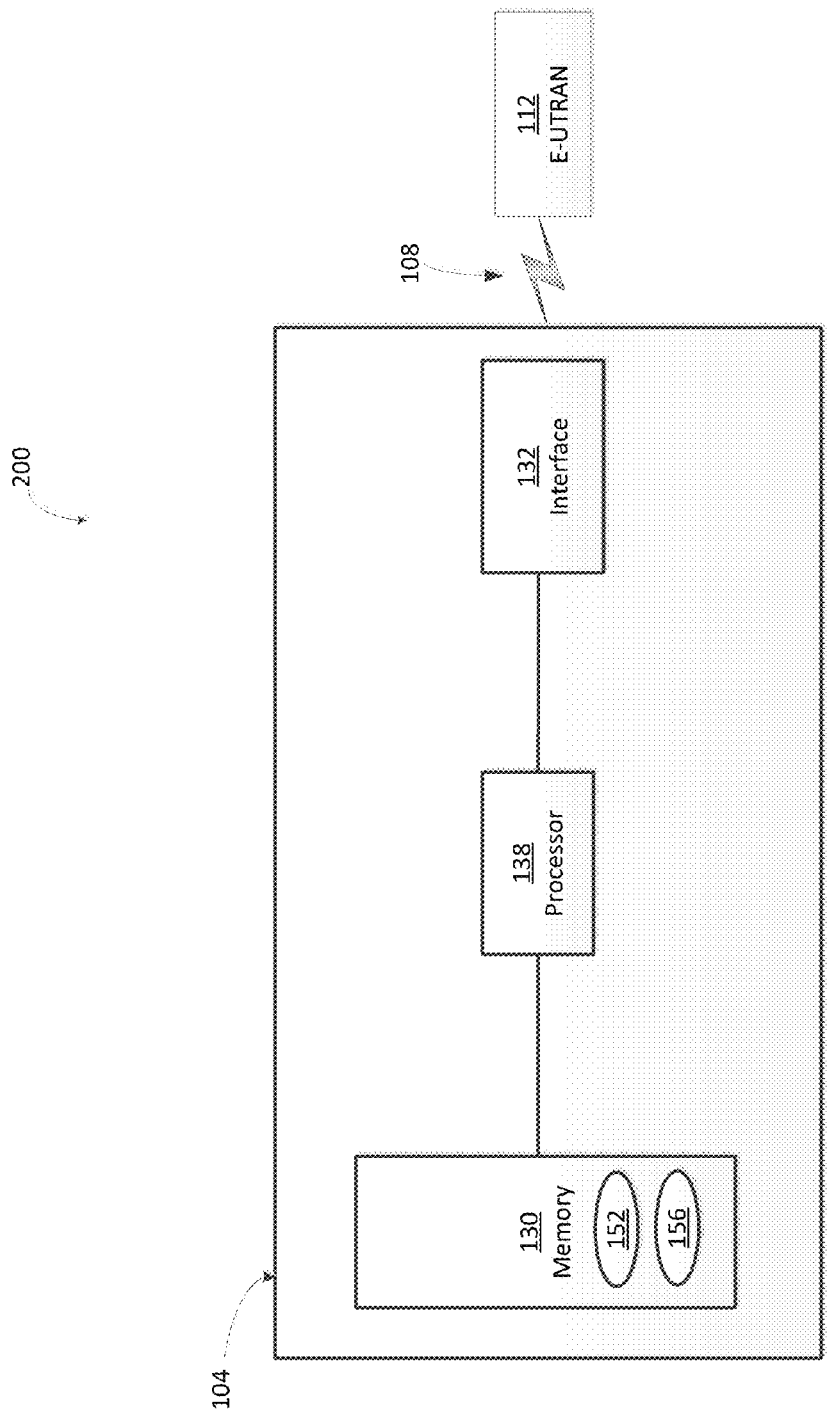
FIG. 2 shows a block diagram of a user equipment in accordance with an aspect of a wireless system for energy saving.

Referring to FIG. 2, an example UE 104 interface with E-UTRAN 112 is indicated at 200. UE 104 includes at least one main processor 138 that controls the overall operation of the UE 104. Main processor 138 is interconnected with a computer readable storage medium such as a memory 130. Memory 130 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc memory. In the present example, memory 130 includes both a volatile memory and a non-volatile memory. Other types of non-transitory computer readable storage medium are also contemplated, such as compact discs (CD-ROM, CD-RW), digital video discs (DVD), secure digital (SD) cards, flash drives, and variants thereof.

UE 104 also includes a communications interface 132 interconnected with processor 138. Communications interface 132 allows UE 104 to perform voice and data communications via link 108. Accordingly, in this non-limiting example, the communication interface 132 receives data from and sends data to evolved UMTS terrestrial radio access network (E-UTRAN) 112 via link 108. In this example implementation of UE 104, the communication interface 132 is configured in accordance with an LTE network, although in variations interface 132 can be configured to communicate with other wired and/or wireless networks.

E-UTRAN 112 handles the radio communications with UEs 104 and allows UEs 104 to communicate with the evolved packet core (EPC) 116. EPC 116 is the network which provides mobility management for UE 104 and allows UE 104 to communicate with external networks 120, e.g. Internet, for both data and voice. Operations, administration and management (OAM) functionalities and/or Self-Organized Network (SON) functionalities to collect and optimize the network operation and the associated system parameters may be performed by a server controlled by the operator. OAM/SON may be associated with E-UTRAN 112 and EPC 116 to maintain the system. Based on the type of the performance optimization, these functionalities may be split and reside in different places within the operator's network.

In use, a received signal or data such as data messages corresponding to a text message, an e-mail message, an audio or video chat or web page download will be processed by the communication interface 132 and input to the processor 138. The main processor 138 will then process the received signal as appropriate.

UE 104 may also include one or more additional elements (not shown) such as input devices, output devices and/or other devices interconnected with main processor 138.

UE 104 maintains, in memory 130, a plurality of computer readable instructions executable by processor 138. Such instructions can include, for example, an operating system and a variety of other applications or modules. For example, as illustrated in FIG. 2, UE 104 stores a network module 156, and a communications module 152.

When processor 138 executes the instructions of network module 156, or communications module 152, processor 138 is configured to perform various functions implemented by the computer readable instructions of the respective applications or modules. It is contemplated that memory 130 can store a variety of additional applications or modules, such as voice applications and others (not shown).

In general, processor 138 is configured, via the execution of network module 152, and communications module 156 to perform voice and data communications through E-UTRAN 112 using the communications protocols and messages utilized by E-UTRAN 112, which in this simplified example are based on the LTE standards.

Figure 3:
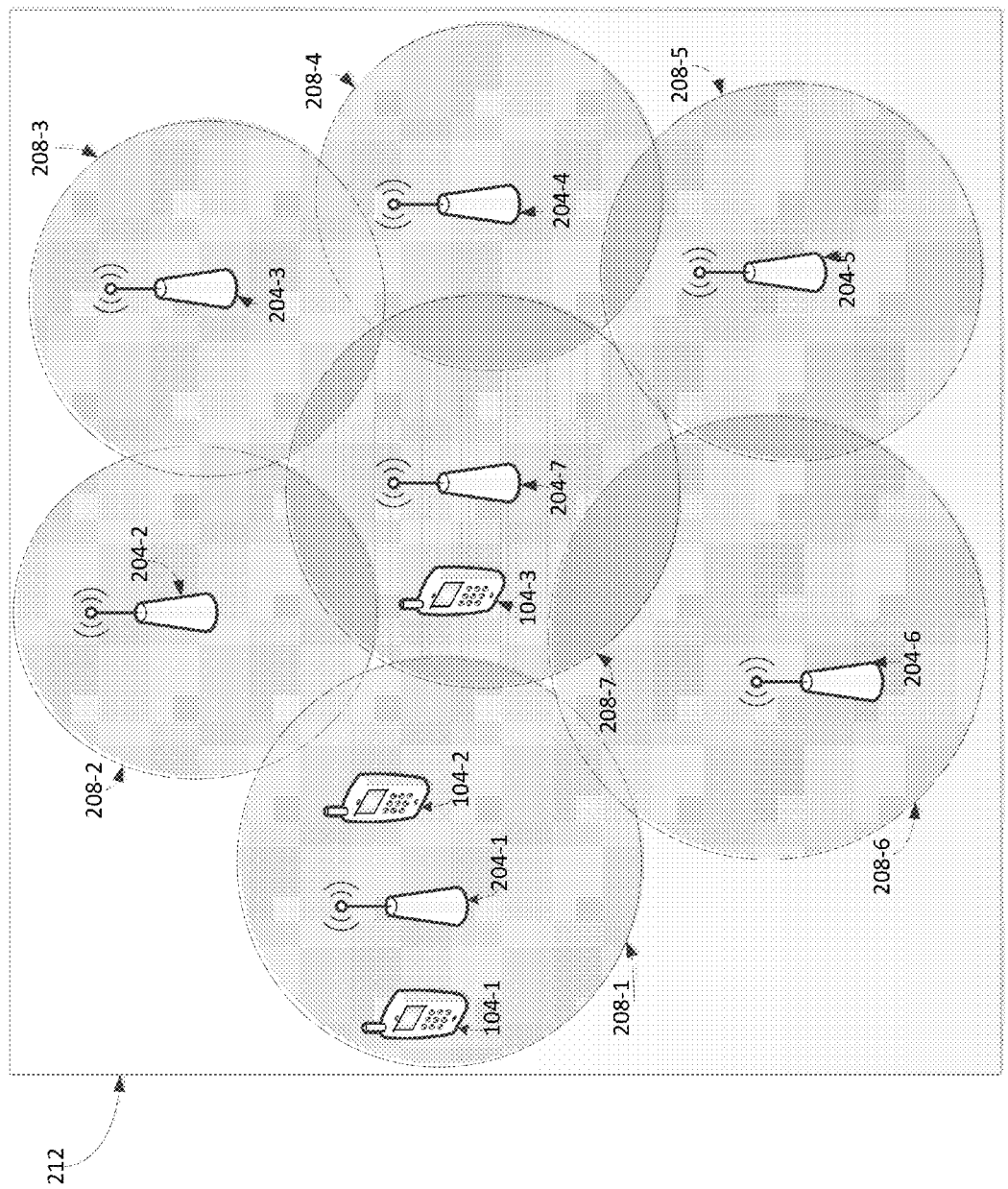
FIG. 3 shows a block diagram of an area in accordance with an aspect of a wireless system for energy saving.

As indicated in FIG. 3, E-UTRAN 116 includes network nodes ("nodes") 204-1, 204-2, 204-3, 204-4, 204-5, 204-6 and 204-7 which are evolved nodes (eNBs) in accordance with the LTE standard which provide coverage to an area 212. Collectively, nodes 204-1, 204-2, 204-3, 204-4, 204-5, 204-6 and 204-7 are referred to as nodes 204, and generically as node 204. This nomenclature is used elsewhere herein. Although in this simplified illustrative example, only one area 212 is shown, in other implementations many areas 212 can be present, and their sizes, and the number of nodes 204 providing coverage for each area can vary. Each node 204 is a base station that may serve one or more UEs 104 in a cell 208. A cell 208 is the area of coverage provided by each node 204. In this example, cells 208-1, 208-2, 208-3, 208-4, 208-5, 208-6 and 208-7 are indicated corresponding to nodes 204-1, 204-2, 204-3, 204-4, 204-5, 204-6 and 204-7, respectively. Collectively, cells 208-1, 208-2, 208-3, 208-4, 208-5, 208-6 and 208-7 are referred to as cells 208, and generically as cell 208. This nomenclature is used elsewhere herein. Although in this example cells 208 are indicated as having elliptical shapes, in other implementations their shape and size can vary based on the transmission parameters, such as the type of the antennae, tilt of the antennae and the transmission power used at the node 204 controlling the cell 208.

When a UE 104 is located in a cell 208, it is typically served by the network node 204 that provides the coverage for cell 208. As an example, as indicated in FIG. 3, cell area 208-1 is served by network node 204-1 which is the serving node for UE 104-1 and UE 104-2. On the other hand, cell area 208-7 is served by node 204-7 which is the serving node for UE 104-3. In variations, there can be different type of network nodes. For example, in addition to standard high transmit power eNBs for macro nodes, nodes can also exist that take the form of low power, small nodes in comparison to macro nodes such as piconodes, relay nodes or femtonodes.

The eNBs may send required system performance and associated system parameters to an OAM/SON server (the IP address of this server is typically known to the eNBs). Based on these reports, the system parameters may be optimized, e.g., based on demand and a recommendation to adjust the system parameters may be sent to one or more eNBs.

A network node 204 sends radio transmission to all the UEs 104 it is serving on the downlink (DL) and receives transmissions from the UEs 104 on the uplink (UL), using signal-processing functions. Each network node 204 is connected to the EPC 116 by means of an S1 interface (not shown). Each node 204 may also be connected to other nearby nodes 204 by an X2 interface (not shown), which is mainly used for signaling and sending X2-Application Protocol (X2-AP) messages as well as user data between nodes 204. S1 and X2 interfaces form the backhaul of wireless system 100. In some implementations, the X2 interface is optional and the S1 interface can be used to handle all the functions of X2. In other implementations S1 and X2 interfaces are not direct physical connections, but rather the information is routed across an underlying IP based transport network.

A node 204 controls a cell 208 by changing the transmission parameters, such as, transmission power, antennae tilt, the antennae mode used (e.g. directional mode or omni-directional mode) and other mechanisms that will now occur to a person of skill in the art. For example, when high power transmission (e.g. 46 dBm) and/or omni-directional antennae mode is used, the area of the cell 208 served by a node 204 may be increased in comparison to when low power transmission (e.g. 30 dBm) or directional antennae mode is used. In some implementations, at least some nodes 204 can support multiple transmission power levels and/or antennae modes, and thus are able to increase or reduce the controlled cell size dynamically.

Figure 4:
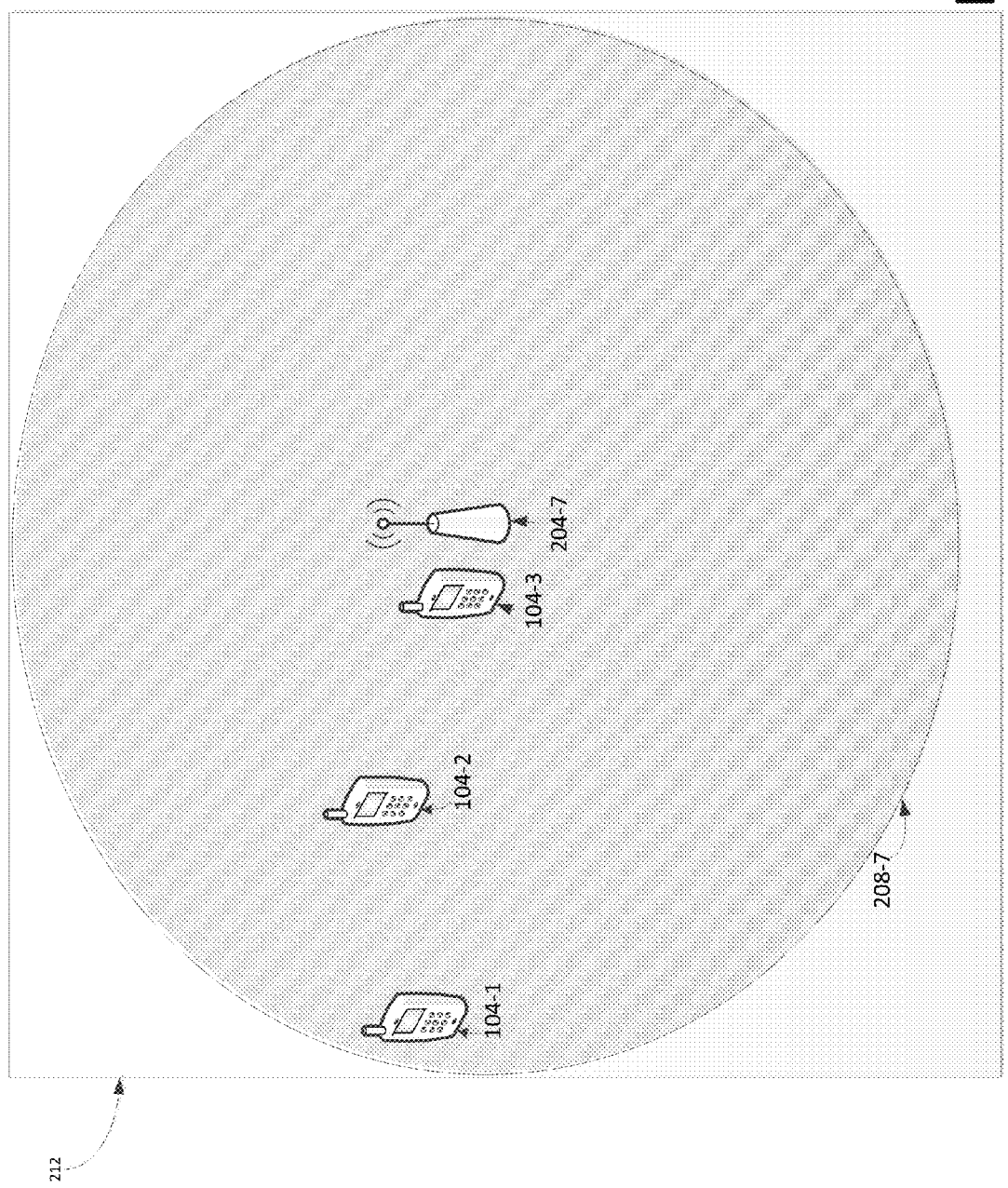
FIG. 4 shows a block diagram of an area in accordance with an aspect of a wireless system for energy saving.

As the number of UEs 104 that engage the wireless system 100 and accordingly the traffic demands on the wireless system 100 increases, network densification can be used to improve traffic capacity and coverage in the wireless system. Network densification allows for the increase of wireless system capacity and coverage by increasing the number of network nodes provided for an area 212. For example, the number of nodes covering an area can be increased, and the cell size for the nodes decreased, thus providing a larger number of cells, and accordingly increasing the capacity of the wireless system 100 for that area. For example, referring to FIG. 4, area 212 can be covered by a single node 204-7. However, as the demands on the wireless system increases, additional nodes can be added, as shown in FIG. 3, to provide additional coverage for the same area.

Figure 5:
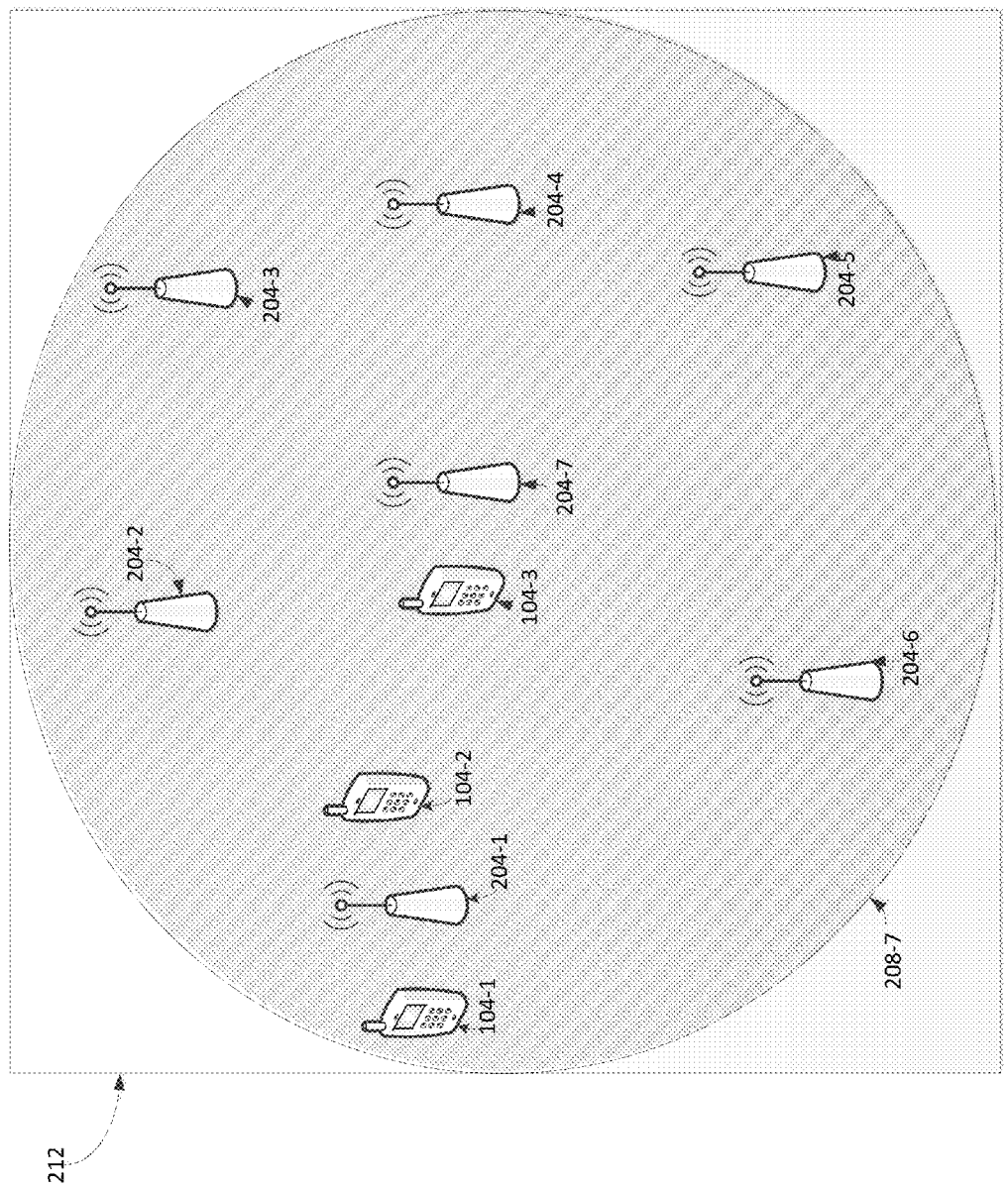
FIG. 5 shows a block diagram of an area in accordance with an aspect of a wireless system for energy saving.

Network nodes 204 can operate in one of at least three power modes: normal power mode; energy saving power mode; and anchor power mode. Typically, node placement is such that when nodes operate in a normal power mode (normal mode), where their power level is in normal mode, their combined cell size covers an area as fully as possible, while reducing overlap of cells to reduce interference and other problems, as shown, for example, in FIG. 3. As the node density of wireless system 100 increases, in some implementations, it may be advantageous to reduce energy consumption of the system. For example, when the traffic demands on wireless system 100 is low, some nodes can enter an energy saving power mode (ES-mode) (for example a reduced power mode) by changing its transmission parameters such as powering down, or adjusting transmission power and/or antenna tilt, and/or switching from the omni-directional antenna to directional antenna mode. When a node enters an ES-mode, it may serve fewer UEs or it may no longer serve any UEs 104. For example, a node 204 may enter in an ES-mode where the cell area 208 it serves is reduced in comparison to when it is at normal mode. Alternatively, referring to FIG. 5, an example is shown where network node 204-7 is the only network node that is serving area 212, as indicated by cell area 208-7, and where the rest of the network nodes, nodes 204-1 through 204-6 are in ES-mode, thus no longer serving a cell area 208 (for example, where they are fully powered down). When network traffic load increases, one or more network nodes 204 which are in ES mode can be turned on and entered into normal mode, or a different ES-mode where they serve a reduced cell area 208 in comparison to normal mode as shown in FIG. 3, providing multi node coverage for the area 212. When the traffic load gets low, as shown in FIG. 5, nodes 204-1 through 204-6 can be turned off, or the power can be reduced, causing those nodes to enter into ES-mode. In this case node 204-7, can be entered into an anchor power mode (anchor mode) where it adjusts its transmission parameters so as to provide coverage for the whole of area 212 through an increased cell 208-7. The size of cell area 208 served by a node 204 can be increased by adjusting transmission parameters, for example, by increasing the transmission power and/or changing the antenna tilt, and/or switching from directional antenna to omni-directional antenna mode. In some variations, where the node deployment is interference limited, when one or more nodes 204 enter into ES mode, the interference level in the system may decrease, and the cell size controlled by the active nodes 204 may automatically increase, without adjusting the transmission parameters for example, due to reduced interference, providing coverage for the cell area of the nodes 204 that have entered into ES mode.

Figure 6:
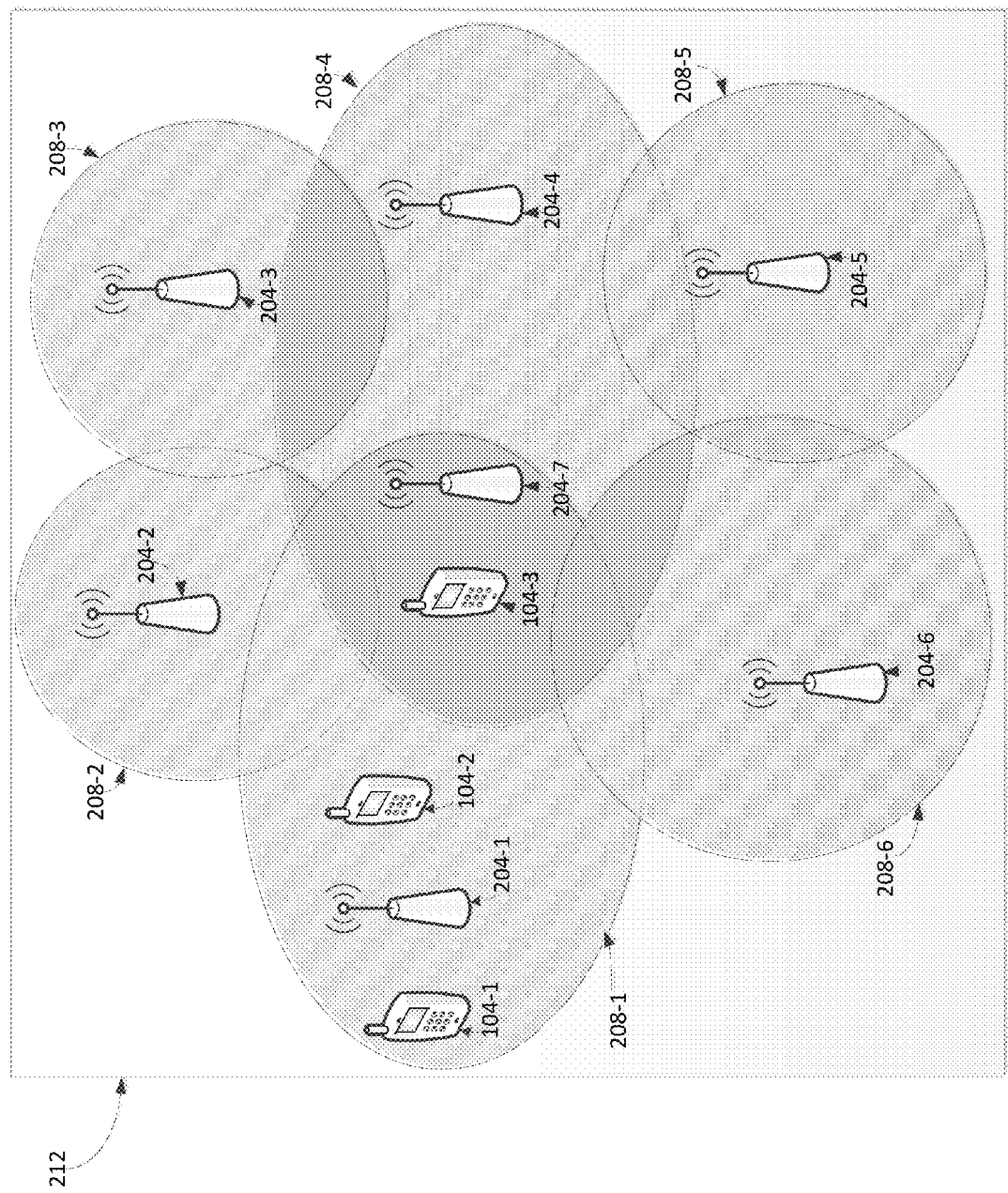
FIG. 6 shows a block diagram of an area in accordance with an aspect of a wireless system for energy saving.

Network nodes 204 can be classified on the basis of their power mode and/or transmission parameter adjustment capabilities. For example, a network node 204 that can operate in anchor mode, and thus can increase its coverage area 208 relative to its normal mode operation (by increasing its transmit power, for example) can be referred to as an anchor node 204. Accordingly, an anchor node would have a smaller cell area when operating at normal mode in comparison to when it is performing anchor mode functionality. In some implementations, multiple anchor nodes can be deployed in a geographical area. For example, as shown in FIG. 6, when node 204-7 enters ES-mode, nodes 204-1 and 204-4 can perform anchor node functionality, adjusting their transmission parameters such that the areas of their cells 208-1 and 208-4 can cover the area that was covered by cell 208-7 of node 204-7. In this example, the anchor nodes are nodes 204-1 and 204-4 which increase their coverage 208 area by performing anchor node functionality to cover the area that was previously served by node 204-7, which has entered ES mode.

A non-anchor node is a node that does not increase the cell area it serves relative to normal mode operation by increasing its transmit power, for example. Accordingly a non-anchor node is a node that operates in normal and ES-modes. An example of a non-anchor node 204, in FIG. 6, is node 204-7 which enters ES-mode. In some implementations the network nodes 204 that perform anchor node functionality and network nodes 204 that can perform non-anchor node functionality can dynamically change on the basis of system traffic, energy savings needs and other system characteristics that will now occur to a person of skill in the art. For example, at some point during the operation of system 100, and as shown in FIG. 5, network node 204-7 can be an anchor node, whereas, network nodes 204-1 through 204-6 can be non-anchor nodes. Alternatively, at a different time in system 100's operation and as shown in FIG. 6, network node 204-7 can be a non-anchor node, whereas network nodes 204-1 and 204-4 can be anchor nodes.

An anchor node 204 may perform its anchor mode functionalities on the same or a different frequency in comparison with when performing at normal mode where it is, for example, at lower transmission power level. For example, referring to FIG. 3, in normal mode, the transmission parameters of node 204-7 can be adjusted to allow, for example, transmission at a lower transmission level on a first frequency F1 and, as shown in FIG. 5 when nodes 204-1 through 204-6 enter ES-mode, transmission parameters of anchor node 204-7 can be adjusted to allow, for example, transmission at a full power level on the same first frequency F1. In another example, in normal mode, anchor node 204-7 can transmit at low power on first frequency F1 and when anchor node 204-7 enters anchor mode, it can transmit at a full power on a second frequency F2. Accordingly, in the latter example anchor node 204-7 is able to transmit on both frequencies F1 and F2.

When a node 204 enters ES mode, and powers down, it may enter one of several different operational states. For example, there could be off state, RX state, and TX state. In the off state, both transmission and reception of a node 204 can be turned off. In this off state, the node is dormant and the UEs in its vicinity can't detect of each other's operational conditions.

Alternatively, in order to maintain some awareness of nearby UEs, a node 204 could maintain its reception functionality at least partially enabled during ES mode. Similarly, in order to advertise its presence to the surrounding UEs, a node 204 could maintain its transmission functionality at least partially enabled during ES mode. For example, in the RX state where some reception functionality is maintained and the transmission is turned off, the dormant node 204 can determine whether there are any UEs 104 nearby via monitoring UL signals. Alternatively, in the TX state where some transmission functionality is maintained and the reception is turned off, a dormant node 204 can be discovered by UEs 104 by having the dormant node 204 transmit, for example, low-density discovery signals. UEs may report these discovered network nodes to respective serving nodes. This procedure may be triggered by the serving node of the UEs in the surrounding area. The serving node may be an anchor node. Not all nodes 204 may be capable of all ES states. TX state and RX state allow a non-anchor node 204 that has entered ES mode to be, nevertheless able to collect information or support information collection regarding nearby UEs and potential network load, and thus provide additional information that can be part basis of a determination of which dormant cells may exit ES mode. In some implementations, the anchor node may request the neighboring nodes which are in an ES mode, to enable both the TX and RX states to assess the UEs and the ES-mode-enabled nodes which can discover each other. In these TX and RX states, there is no active data transmission between the ES-mode-enabled nodes and the UEs. In some other implementations, the anchor node may also decrease its transmission power by adjusting its transmission parameters, for example, to reduce its cell area. The power reduction of the anchor node may need coordination with the neighboring nodes in order to make sure sufficient coverage in the area.

The power mode (normal mode where a node 204 operates normally, anchor mode where a node 204 increases the area of its cell 208, and ES mode where a cell 204 goes into dormancy) and the ES state at which a node operates when that node enters ES mode (off state, where both transmission and reception are off, TX state, where some transmission functionality is maintained, and RX state where some reception functionality is maintained) of a node 204 can be determined through various mechanisms. A node 204 can let neighboring nodes know which ES states it can support via backhaul signaling, by for example using X2-AP messaging. Moreover, a node can also inform its neighboring nodes whether it is in an anchor mode, normal mode, or ES mode, and if in ES mode, which ES state it is currently in, also through backhaul signaling. A node can also request its neighboring nodes to enter an anchor mode, normal mode, or one of the ES states of the ES mode. In an alternative implementation, a node's ES state can be determined by its discontinuous reception (DRX) and discontinuous transmission (DTX) configurations. For example, a node 204 could have different DTX/DRX configurations. Accordingly, DTX with infinite period can mean RX state such that a node 204's transmission is shut off, whereas DRX with infinite period can mean TX state such that the node 204's reception is shut off. DTX and DRX both with infinite period can mean off state such that the node 204's reception and transmission both are shut off. When there are no DTX/DRX configurations, the node 204 can be assumed to operate in the continuous mode for TX/RX. A node's DTX/DRX configurations can be exchanged with its neighboring nodes, and could be dynamically changed based on the various factors, such as the traffic loading. In some implementations, the DTX/DRX configurations can be based in part on system information transmission, paging, and others that will now occur to a person of skill in the art. Such configurations may need to be signaled to the UEs via the broadcast signaling.

Determination of which nodes 204 can enter ES mode to save energy, and which nodes 204 can enter anchor mode to compensate for coverage can be accomplished through various mechanisms and methods. For example, an operator may determine a configuration for the nodes 204, classifying each as anchor and non-anchor nodes and provide the configuration in operation administration and maintenance (OAM). The transmit parameters of anchor and non-anchor nodes in ES and non-ES modes may also be included in the configuration and provided by OAM. In a variation, the determination of anchor and non-anchor cells as well as their transmit parameters may also be determined through self-optimization network (SON) functionality.

Multiple configurations can be provided, or the configuration can be dynamically updated, based on different traffic demands for the system 100. Accordingly, when the traffic is only low for some nodes such as node 204-7, node 204-7 may be classified as a non-anchor node, and nodes 204-1 and 204-4 may be classified as anchor nodes as shown in FIG. 6. Alternatively, when the traffic demands are low for area 212 as a whole, node 204-7 can be classified as an anchor node, and nodes 204-1 through 204-6 classified as non-anchor nodes as shown in FIG. 5.

In order to facilitate entering ES mode, a non-anchor node 204 may obtain information regarding anchor nodes 204 such as which anchor node or nodes 204 will enter anchor mode to provide radio coverage for the UEs 104 served by the non-anchor node 204 when the non-anchor node 204 enters ES mode. The information needed can be obtained from the OAM configurations discussed above, from SON or through X2-AP messaging with neighboring nodes 204. The information obtained by a non-anchor node 204 could subsequently be used to determine which nodes 204 to hand over UEs 104 being served by it. An anchor node 204 can also obtain information regarding the non-anchor nodes 204 so as to determine nodes 204 that will be in its coverage area when it enters anchor mode. Similarly, an anchor node 204 may obtain information regarding non-anchor nodes 204 in its vicinity to facilitate ES mode triggering. This information may be updated frequently.

Entering a non-anchor node 204 into ES mode may require several considerations. As an example, consideration can be given to the processes and timing for turning off the non-anchor nodes 204 while maintaining the coverage over an area served by those non-anchor nodes and thus reducing the service interruption time for UEs 104. For example, to ensure radio coverage over the area 212, non-anchor nodes 204-1 through 204-6 may remain in normal mode until the anchor node 204-7 transmits, for example, at full power or transmits at a sufficiently high level to reach all the UEs in area 212. In a variation where there are multiple anchor nodes for an area, non-anchor nodes may not enter ES-mode until some or all of the anchor nodes transmit at the full power or transmit at a sufficiently high power to reach all the UEs in an area.

Figure 7:
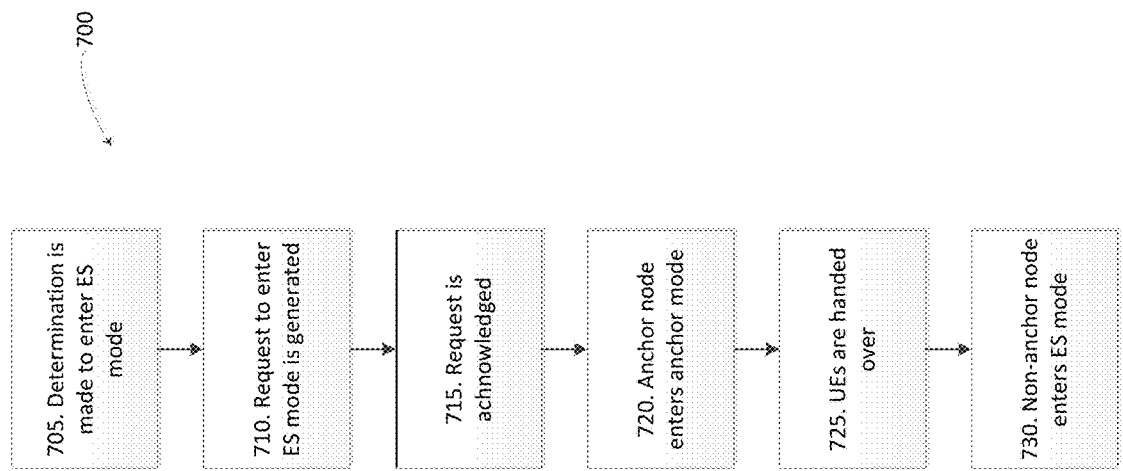
FIG. 7 shows a flow chart indicating an exemplary method of entering an energy savings mode.

Referring now to FIG. 7, a method for entering ES mode is indicated at 700. In order to assist in the explanation of the method, it'll be assumed that method 700 is operated using system 100 as shown in FIG. 1 and area 212 as indicated in FIG. 3. Additionally, the following discussion of method 700 leads to further understanding of system 100. However, it is to be understood that system 100, and method 700 can be varied, and need not work exactly as discussed herein in conjunction with each other, and that such variations are within scope.

Referring now to method 700, a determination is made to enter ES mode at 705. This determination may be made at a network node, such as 204-7, or OAM/SON server. The decision to enter ES mode can be based on information relating to area 212 obtained through backhaul X2-AP messaging such as the physical resource block (PRB) usage statistics provided in resource status reporting. When the anchor node 204-7 decides that the traffic demands in area 212 get sufficiently low, the system may enable ES mode by instructing one or more of the non-anchor nodes 204, in its vicinity, into ES mode. Alternatively, the decision can be based on a load for one or more of the non-anchor nodes 204 as opposed to the load for the entire area.

Next, at 710 a request to enter ES mode is generated. The request can take the form of an X2-AP message in accordance with LTE standards. At 715 the request is acknowledged. The request can take the form of an X2-AP message in accordance with LTE standards. At 720, at least one anchor node enters anchor mode. At 725, UEs associated with the non-anchor nodes are handed over to the anchor nodes that entered anchor mode. At 730, at least one non-anchor node enters ES mode.

Figure 8:
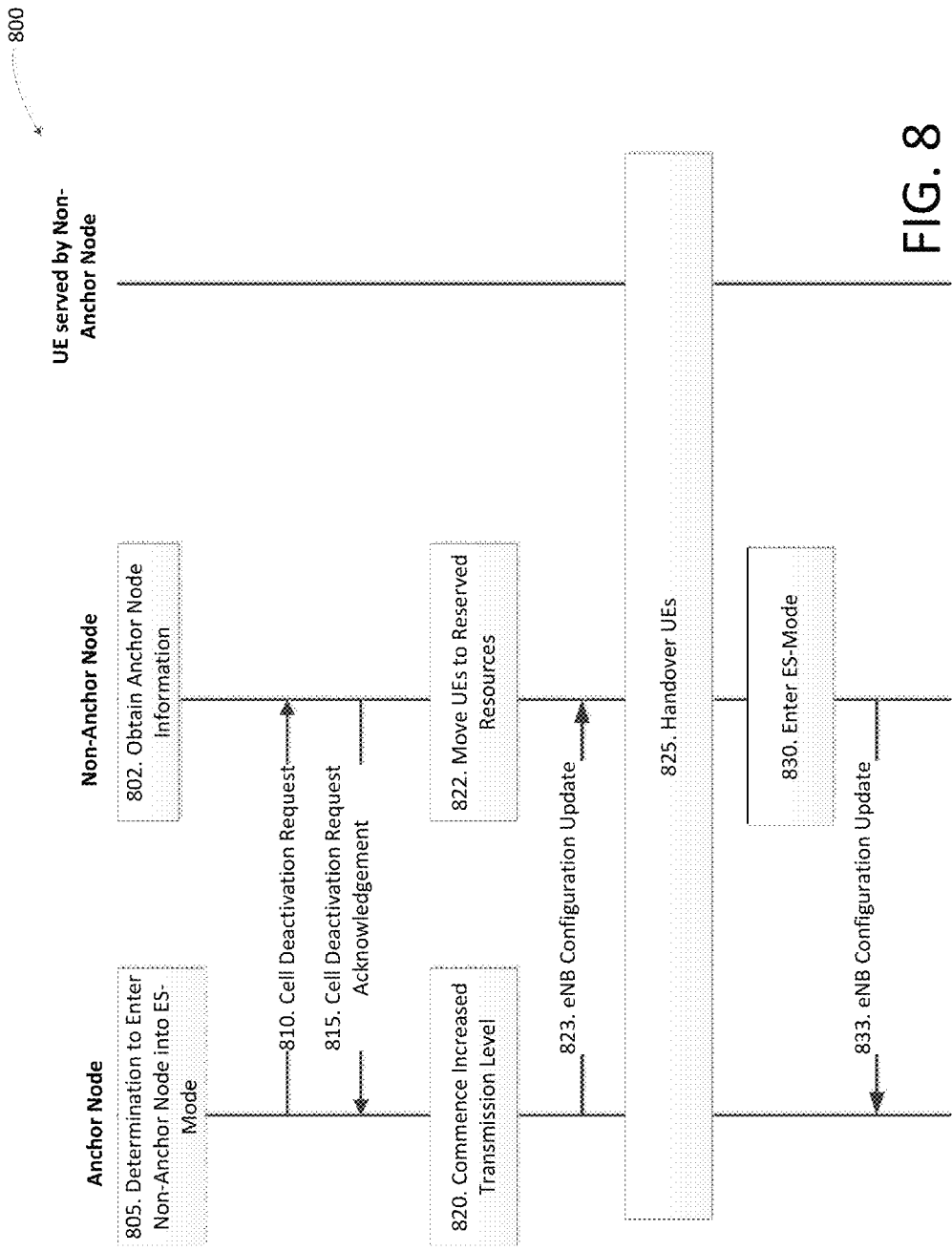
FIG. 8 shows a flow diagram indicating an exemplary method of entering an energy savings mode.
Figure 9:
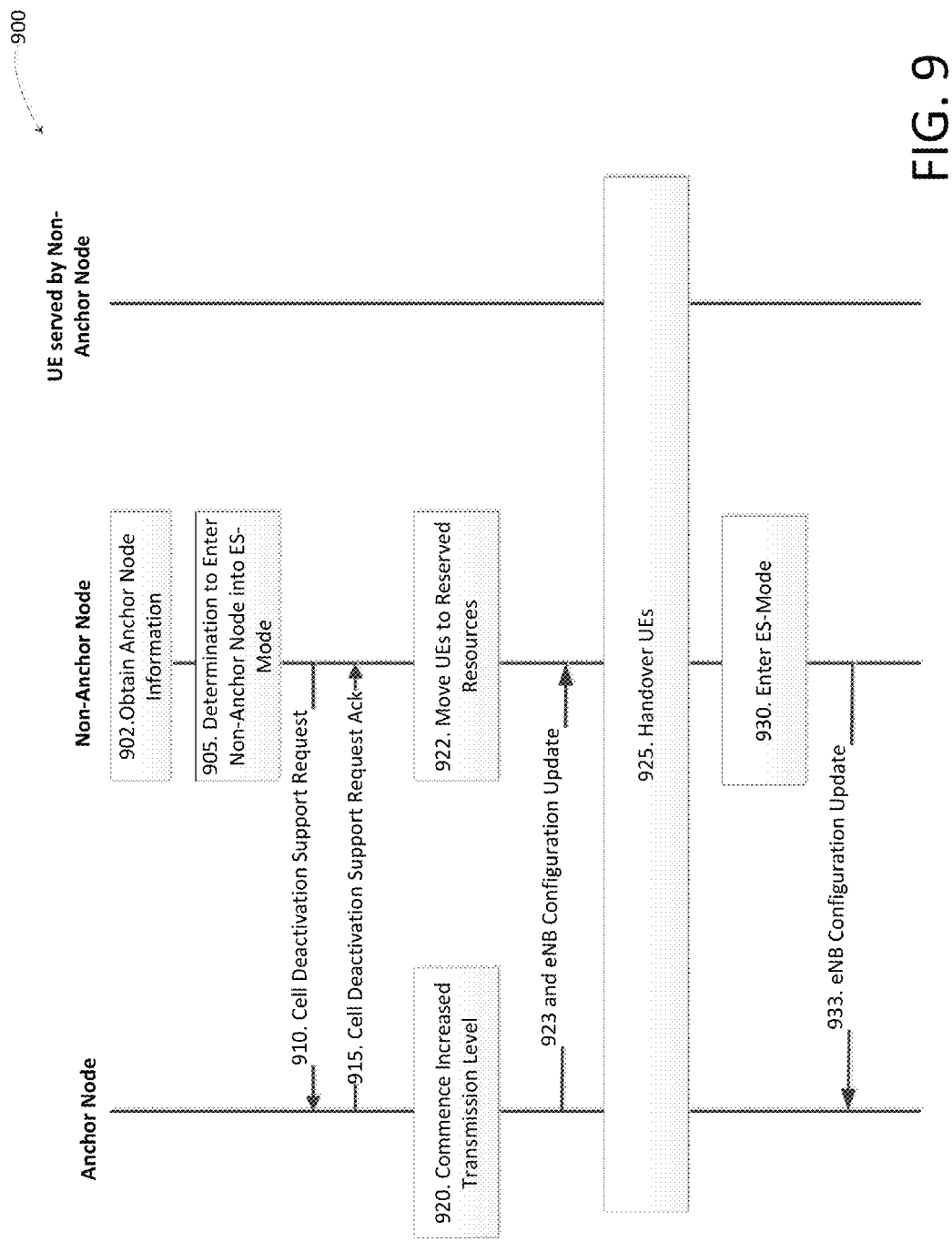
FIG. 9 shows a flow diagram indicating an exemplary method of entering an energy savings mode.
Figure 10:
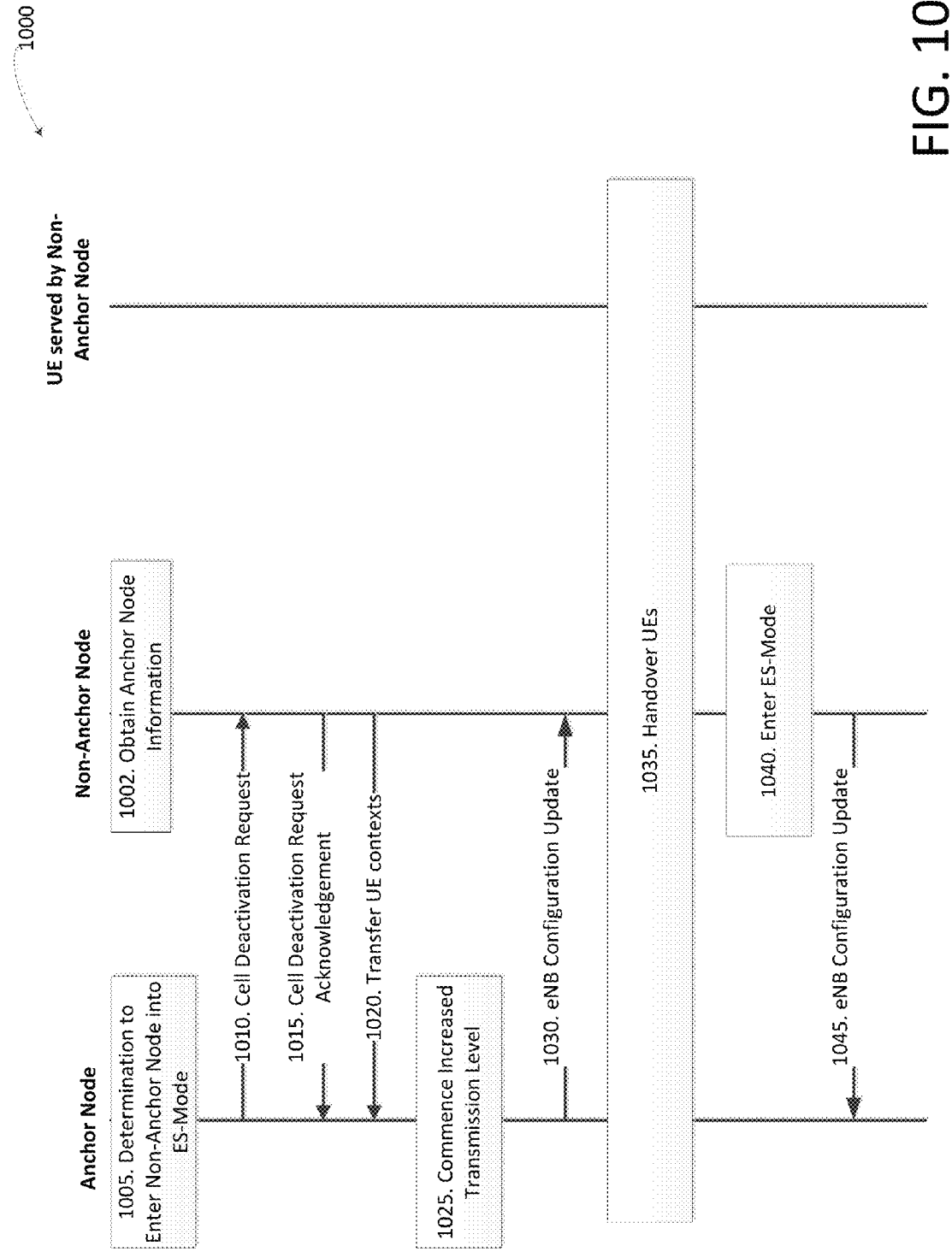
FIG. 10 shows a flow diagram indicating an exemplary method of entering an energy savings mode.

Flow diagrams 800, 900 and 1000 indicated at FIG. 8, FIG. 9 and FIG. 10 respectively, further illustrate the performance of method 700. As a non-limiting illustrative example, it will be assumed that for area 212 as shown in FIG. 3, a configuration is used where node 204-7 is the anchor node, and nodes 204-1 through 204-6 are non-anchor nodes. Accordingly, in the present example, it is the non-anchor nodes 204-1 through 204-6 that enter ES mode, and it is node 204-7 that performs anchor mode functionality.

During the performance of method 700, in some implementations, determination to enter non-anchor nodes into ES-mode is made at the anchor node. Referring now to FIG. 8, the non-anchor nodes obtain anchor node information at 802 as described above. At 805, a determination is made at anchor node 204-7 to enter non-anchor nodes 204-1 through 204-6 into ES-mode. In some implementations where there are multiple anchor nodes in an area 212, one anchor node 204 could be the central coordinator to make the decision whether to enter ES mode. In variations, the coordinator anchor node 204 that makes the decision may not be the anchor node that will be entering anchor mode to provide coverage for the nodes 204 that enter ES mode. In some implementations, the functionality of making the decision whether to enter or exit ES mode could reside in any network node. Once the network node makes the decision, it could notify the anchor nodes and/or non-anchor nodes. In some other implementations, the decision for entering or exiting ES mode is made at a network entity such as, OAM/SON. From the frequent information updates received from various network nodes, the OAM/SON may decide to trigger ES mode at selected non-anchor nodes and cause selected anchor nodes to enter anchor mode functionality by respectively causing the transmission parameters of the nodes to be adjusted as appropriate to achieve the desired functionality. The information updates may include the system load, UE's connected to the network nodes, interference power level on both UL and DL and others that will now occur to a person of skill in the art. In some other implementations, a new network entity may be defined which coordinates ES operations in certain areas. The function may be embedded in any existing node or all nodes.

Continuing with FIG. 8, at 810, a Cell Deactivation Request (CDR) X2-AP message is sent as a request message. In the present illustrative example, where the decision to enter ES mode is made by the anchor node 204-7, the anchor node 204-7 requests non-anchor nodes 204-1 through 204-6 to enter ES mode. In variations, an anchor node may request only some of the non-anchor nodes to enter ES mode.

The request message can include an identifier Cell-ID of the node to deactivate, such as E-UTRAN Cell Global Identifier (ECGI). This X2-AP message can then be transmitted to the non-anchor cell 204 with the Cell-ID. In variations, the same CDR message can be sent to multiple non-anchor nodes 204. The message sent to the multiple non-anchor nodes can also include all of the non-anchor nodes' Cell-IDs in the message. In other variations, the request can be transmitted to other nodes as needed. For example, where there are multiple anchor nodes, the message can be sent to other anchor nodes if they are to enter anchor mode in response to the non-anchor node entering ES mode. In yet further variations where there are multiple anchor nodes providing coverage for a single non-anchor node, each anchor node that will provide coverage for a non-anchor node can generate its own CDR message and send it to the same non-anchor node 204.

The CDR message can include additional information to assist with the transition to ES mode as indicated in Table I. For example the anchor node 204-7 can also provide non-anchor nodes 204-1 through 204-6 information regarding when it will enter anchor mode by transmitting at full power and/or switching to omni-directional antenna mode, for example. This could, accordingly, indicate the time for entering ES mode at the non-anchor nodes 204-1 through 204-6. Having an indication of the time at which to enter ES mode can allow a non-anchor node 204 to determine when to handover UEs 104 it is serving to the anchor node 204-7 that will provide coverage for the non-anchor node's cell area. Where the anchor node 204-7 enters anchor mode at a different frequency than the one it uses normally, having an indication of the time at which to enter ES mode allows a non-anchor node 204 to determine when to configure its UEs 104 to perform inter-frequency measurement in anticipation of the handover.

TABLE I

Example CDR X2-AP message

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Deactivate | | 1 .. <maxCellineNB> | | | GLOBAL | reject |
| >ECGI | M | | 9.2.14 | | — | — |
| >time to enter ES mode | O | | | | | |
| >reserved resources | O | | | | | |

TABLE I-continued

Example CDR X2-AP message

| IE/Group Name | Presence | Range | IE type and reference | Semantics description | Criticality | Assigned Criticality |
|---|---|---|---|---|---|---|
| >ES mode | | | ENUMERATED (TxoffRxoff, TxoffRxon, TxonRxoff...) | | | |
| Range bound | | Explanation | | | | |
| maxCellineNB | | Maximum no. nodes that can be served by an eNB. Value is 256. | | | | |

The timing could be indicated through, for example, a system frame number (SFN) at the anchor cell 204-7. In some implementations, a non-anchor node can discover the SFN offset and subframe number offset with respect to the anchor cell through various mechanisms that will now occur to a person of skill in the art. In one implementation, to allow all the neighboring nodes 204 to receive the CDR message before the anchor node 204-7 enters anchor mode, a guard time may be added to the time for entering anchor mode or ES mode to account for backhaul delay. In another variation, an active time may be associated with the CDR message, which could be indicated by the absolute SFN referenced to the anchor node.

In variations, the CDR message can also include an indication of resources to be reserved. In one implementation, the anchor node 204-7 enters the anchor mode transmitting at the same frequency as the non-anchor nodes 204-1 through 204-6. In such an implementation, anchor node 204-7 can enter anchor mode while the non-anchor nodes are also powered to facilitate the handover of the UE's served by the non-anchor nodes. After the anchor node 204-7 enters anchor mode but before the UEs 104 served by the non-anchor cells 204-1 through 204-6 are handed over to the anchor cell 204-7, the UE's associated with the non-anchor node may experience interference from the adjusted transmission parameters by the anchor cell 204-7 (for example by increased transmission power level).

To lessen the impact of interference, anchor node 204-7 can reserve some resources in time and/or frequency domain for low power or blank transmissions to maintain the radio link quality of the UEs 104 served by the non-anchor nodes 204. The reserved resources can be communicated, e.g., through the CDR message. The UEs can be moved to the reserved resources during the handover transition period to avoid interference from the anchor cell. For example, the anchor node 204-7 could configure some almost blank subframes (ABSs) so that the non-anchor nodes 204-1 through 204-6 could schedule their cell-edge UEs 104 or UEs with low signal to interference plus noise ratio (SINR) during the ABSs, before these UEs 104 are handed over to the anchor node 204-7. Accordingly different measurements such as radio link monitoring (RLM), radio resource management (RRM) and channel quality indicator (CQI), can be performed on the reserved resources for the UEs 104 being served by the non-anchor nodes 204-1 through 204-6.

Additionally, the CDR message can also include an indication of the ES state (e.g., off, TX state or RX state, etc.) a non-anchor cell 204-1 through 204-6 is requested to enter. Other information that can be included with CDR to assist with the transition to ES mode will now occur to a person of skill in the art. Continuing with FIG. 8, non-anchor nodes 204-1 through 204-6 send cell deactivation request acknowledgment to anchor node 204-7 that they can and are preparing to enter the requested ES mode and state as indicated at 815 of flow diagram 800.

Continuing with FIG. 8, at 820, anchor node 204-7 enters anchor mode by increasing transmission level relative to normal mode operation by, adjusting its transmission parameters, by for example, adjusting transmission power and/or antenna tilt, and/or switching from directional antenna to omni-directional antenna mode at a time indicated by the CDR message. In a variation where there are multiple anchor nodes, different anchor nodes can enter anchor mode at different times. In a further variation, the anchor node may not signal the time of anchor mode entry.

In the present example where reserved resources are used, the UEs are moved to reserved resources as indicated at 822 of flow diagram 800. The reserved resources can be gradually reduced as the UEs served by the non-anchor nodes are handed over to the anchor node 204-7. In a variation, anchor nodes may synchronize on the reserved resources. In another variation, the non-anchor nodes could gradually reduce transmission power including the reference signal power, Physical Downlink Control Channel (PDCCH) power, and others that will now occur to a person of skill. As the signal from the non-anchor node gets weak, a UE 104 served by that node may automatically trigger an A3 measurement report and the UE 104 may be handed over to the best neighbor node. In one variation, the best neighbor node may be, the node from which the UE sees the strongest signal strength. An A3 event may be triggered at the UE if the received signal strength from a neighboring node is better than that of the serving node by a threshold. The measurement report triggered by an A3 event is called A3 measurement report. This may effectively force a UE 104 to move to another node via regular measurements.

At 823, the anchor node 204-7 notifies the non-anchor nodes 204-1 through 204-6 about the power mode change. The change may be signaled, e.g., via an X2-AP message such as an eNB Configuration Update (CU) message in accordance with LTE standards, but modified to include adjusted transmission parameters such as transmission power level. After receiving notification through the modified CU message, the non-anchor nodes can hand over UEs 104 served by them to the anchor node 204-7. In a variation, the non-anchor nodes can be aware of the anchor node's power mode change to anchor mode via a network listening function such as by monitoring the anchor node's signal strength through a UE functionality.

Continuing with FIG. 8, as indicated at 825 of flow diagram 800, non-anchor nodes 204-1 through 204-6 hand over UEs to anchor node 204-7. In some implementations, when the anchor node 204-7 increases power, some UEs 104 served by the non-anchor nodes will automatically trigger A3 events and they will be handed to the best target node. Some UEs 104 may not, however, trigger A3 events, when for example the UEs 104 are very close to a non-anchor node. These UEs 104 may be requested to perform measurement reporting (for example configure periodical reporting) to decide which node each such UE 104 should be handed over to. To reduce UE 104 processing, a UE 104 may be instructed to measure only the anchor nodes in the area by giving the UEs the anchor nodes' Cell-IDs since all the UEs will eventually be handed into anchor nodes. The anchor nodes' Cell-IDs may be signaled to the UE via a radio resource control protocol RRC message. In some implementation after the UEs are handed into the anchor node before the non-anchor node is powered down, the UEs may see strong interference from non-anchor node. The non-anchor cell may reserve some resources in time and/or frequency domain for low-power or blank transmission to maintain the radio link quality of the UEs served by the anchor node.

In case of one anchor node in the area, such as anchor node 204-7, since the handover target node is always the anchor node, to reduce signaling, UEs 104 may be instructed to suppress A3 measurement reports during the handover transition period. This can be achieved by not configuring A3 event in measurement configuration. To reduce the backhaul signaling, the group handover request (group UE context transfer to anchor node 204-7) and group path switch may be performed to efficiently handover the UEs 104 served by a non-anchor node 204 to the anchor node 204-7.

Once the non-anchor nodes 204-1 through 204-6 hand over UEs 104 served by them, they enter ES mode as indicated at 830 of flow diagram 800. The non-anchor nodes can notify the anchor node 204-7 about the entry into ES mode via a modified X2-AP CU message, modified to include reduced transmission levels, as indicated at 833. In a variation, the existing X2-AP CU message can be used. In some implementations where there are multiple anchor nodes, the non-anchor nodes could send a CU message modified to include transmission power levels to multiple anchor nodes. In some variations, the CU message could be modified to also include an indication of the ES mode state (e.g. TX state, RX state, off, etc.) the non-anchor node 204 enters. When an anchor node knows the ES state of a non-anchor node, and when the ES state is TX state or RX state, an anchor node could monitor potential traffic loads in the cell area 208 of non-anchor nodes 204 by obtaining relevant information regarding the non-anchor cells since non-anchor cells in those two states may obtain or facilitate obtaining relevant information as they are not fully shut down.

In implementations where reserved resources are used, after all of the non-anchor nodes 204 enter ES-mode, the anchor node 204-7 could resume the use of the reserved resources.

During the performance of method 700, in some implementations, the decision to enter a non-anchor node, such as 204-1, into ES-mode can be initiated at the non-anchor node based on its current load and the availability of potential nodes 204 to handover the UEs it is currently serving that are, for example, in Radio Resource Control connected (RRC_connected) mode. The decision can, for example, be based on the availability of capacity at the surrounding anchor nodes 204 as determined by information obtained from anchor nodes as indicated at 902 of flow diagram 900 shown in FIG. 9. This information can be obtained by the non-anchor node 204 through X2-AP messaging. Based on the obtained information a non-anchor node 204-1 can then make a determination to enter ES-mode as indicated at 905.

Once a determination is made by the non-anchor node 204-1, it can notify the anchor node 204-7. In a variation, when the non-anchor node 204-1 determines that entering into ES mode would be appropriate, the non-anchor node 204-1 sends a request to the anchor node 204-7. It is the anchor node 204-7 that makes the final decision.

At 910, the non-anchor node 204-1 initiates a request to enter ES mode. Accordingly, the request can take the form of an X2-AP message in accordance with LTE standards, for example a Cell Deactivation Support Request (CDSR) message, and include the Cell-ID of, e.g., the non-anchor node 204-1 that is seeking to enter ES mode. This X2-AP message can then be transmitted to the anchor cell 204-7. In a variation where there are multiple anchor nodes, the message can be transmitted to all anchor nodes. In a further variation the message could be transmitted to a coordinating anchor node, and the coordinating anchor node could then transfer it to the other anchor nodes as appropriate.

Continuing with FIG. 9, anchor cell 204-7 acknowledges the request as indicated at 915 of flow diagram 900. The acknowledgement can be based, for example, on the ability of anchor node 204-7 to enter anchor mode and accommodate additional UEs 104. The CDSR acknowledgement, similar to a CDR message, can take the form of an X2-AP message in accordance with the LTE standards and include additional information to assist with the transition to the ES mode including indications for time to enter ES mode, reserved resources, ES state to transition into, as well as others that will now occur to a person of skill in the art. Upon receiving the acknowledgement, the non-anchor node 204-1 can prepare to handover the UEs 104 served by it to the anchor node 204-7. In case of multiple anchor nodes covering the area of the non-anchor node, the non-anchor cell may be unable to turn off unless all the associated anchor cells are willing to enter anchor mode and acknowledge this through an acknowledgement message. In a further variation the acknowledgement from multiple anchor nodes could be transmitted to a coordinating anchor node, and the coordinating anchor node could acknowledge to the non-anchor node on behalf of all the anchor nodes.

Continuing with FIG. 9, at 920, anchor node 204-7 enters anchor mode by adjusting its transmission parameters by, for example, increasing transmission level relative to normal mode operation by, adjusting transmission power and/or antenna tilt, and/or switching from directional to omni-directional antenna mode, at a time which may be indicated by the CDSR acknowledgement message.

In a variation where there are multiple anchor nodes, different anchor nodes can enter anchor mode at different times. In a further variation, the anchor node may not signal the time of anchor mode entry.

In the present example where reserved resources are used, the UEs are moved to reserved resources as indicated at 922 of flow diagram 900. The reserved resources can be gradually reduced as the UEs served by the non-anchor node 204-1 are handed over to the anchor node 204-7. In a variation, anchor nodes may synchronize on the reserved resources. In another variation, the non-anchor nodes could gradually reduce transmission power including the reference signal power, Physical Downlink Control Channel (PDCCH) power, and others that will now occur to a person of skill. As the signal from the non-anchor node gets weak, a UE 104 served by that node will automatically trigger an A3 measurement report and the UE 104 will be handed over to the best neighbor node. This effectively forces a UE 104 to move to another node via regular measurements.

At 923, the anchor node 204-7 notifies the non-anchor node 204-1 about the power mode change via an X2-AP message such as an eNB Configuration Update (CU) message in accordance with LTE standards, but modified to include the transmission power level. After receiving notification through the modified CU message, the non-anchor nodes can hand over UEs 104 served by them to the anchor node 204-7. In a variation, the non-anchor nodes can be aware of the anchor node's power mode change to anchor mode via a network listening function such as by monitoring the anchor node's signal strength through a UE functionality.

Continuing with FIG. 9, as indicated at 925 of flow diagram 900, non-anchor node 204-1 hands over UEs to anchor node 204-7. In some implementations, when the anchor node 204-7 increases power, some UEs 104 served by the non-anchor node 204-1 may automatically trigger A3 events and they may be handed to the best target node. A3 events are triggered when one or more neighboring nodes become better potential serving nodes than the current serving node based on offset and hysteresis values. Some UEs 104 may not, however, trigger A3 events, when for example the UEs 104 are very close to a non-anchor node. These UEs 104 may be requested to perform measurement reporting (for example configure periodical reporting) to decide which node each such UE 104 should be handed over to. To reduce UE 104 processing, a UE 104 may be instructed to measure only the anchor nodes in the area by giving the UEs the anchor nodes' Cell-IDs since all the UEs will eventually be handed into anchor nodes. The anchor nodes' Cell-IDs may be signaled to the UE via an RRC message. In some implementation after the UEs are handed into the anchor node, and before the non-anchor node is powered down, the UEs may see interference from non-anchor node. The non-anchor node may reserve some resources in time and/or frequency domain for low-power or blank transmission to maintain the radio link quality of the UEs served by the anchor node.

In the case where there is a single anchor node in the area, such as anchor node 204-7, since the handover target node is always the anchor node, to reduce signaling, UEs 104 may be instructed to suppress A3 measurement reports typically triggered by A3 events during the handover transition period. This can be achieved by not configuring A3 events in measurement configuration. To reduce the backhaul signaling, the group handover request (group UE context transfer to anchor node 204-7) and group path switch may be performed to efficiently handover the UEs 104 served by a non-anchor node 204-1 to the anchor node 204-7.

Once the non-anchor nodes 204-1 through 204-6 hand over UEs 104 served by them, they enter ES mode as indicated at 930 of flow diagram 900. The non-anchor nodes notify the anchor node 204-7 about the entry into ES mode via a modified X2-AP CU message, modified to include reduced transmission levels, as indicated at 933. In a variation, the existing X2-AP CU message can be used. In some implementations where there are multiple anchor nodes, the non-anchor nodes could send a CU message modified to include transmission power levels to multiple anchor nodes. In some variations, the CU message could be modified to also include an indication of the ES mode state (e.g. TX state, RX state, or off, etc.) the non-anchor node 204 enters. When an anchor node knows the ES state of a non-anchor node, and when the ES state is TX state or RX state, an anchor node could monitor potential traffic loads in the cell area 208 of non-anchor nodes 204 by obtaining relevant information from the non-anchor cells since non-anchor cells in those two states are able to obtain relevant information as they are not fully shut down.

In implementations where reserved resources are used, after the non-anchor node 204-1 enters ES-mode, the anchor node 204-7 could resume the use of the reserved resources.

During the performance of method 700, in some variations, anchor 204-7 may not reserve any resources for interference avoidance. For example, see flow diagram 1000 at FIG. 10.

After a determination is made for a non-anchor node to enter ES-mode at 1005, the CDR message sent, as indicated at 1010 would include the Cell-ID of the node(s) to enter into ES mode and an indication of time to enter ES mode, but not reserved resource information. In variations, reserved resources can be indicated in the message but ignored.

Where resources are not reserved, when the anchor node 204-7 enters anchor mode, some of the UEs 104 served by the non-anchor nodes 204-1 through 204-6 can go to radio link failure (RLF) due to interference from the anchor node 204-7. RLF involves two phases. The first phase is the RLF detection. A UE declares RLF if the signal quality from the serving node 204 is lower than a threshold over a period of time. For example, a UE being served by a node 204 measures the DL radio link quality of the serving node 204 based on Cell-specific Reference Signal (CRS) every radio frame (i.e. 10 msec). If the radio link quality filtered over the last 200 msec becomes lower than a threshold Qout, an out-of-sync indication is generated. If the radio link quality filtered over the last 100 msec becomes better than the threshold Qin, an in-sync indication is generated. The threshold Qout may correspond to signal level of 10% error rate of a hypothetical PDCCH transmission taking into account the Physical Control Format Indicator Channel (PCFICH) errors. The threshold Qin is the level at which the DL radio link quality can be significantly more reliably received than at Qout and can correspond to 2% block error rate of a hypothetical PDCCH transmission taking into account the PCFICH errors with transmission. When a UE detects N310 consecutive out-of-sync indications, N310 indicating a threshold of consecutive out-of-sync indications, the UE determines that it is detecting a radio link problem and starts a timer T310. When T310 is running, if the UE detects N311 consecutive in-sync indications where N311 is a threshold of consecutive in-sync indications, (namely the radio link quality gets better), timer T310 stops. If timer T310 expires, the UE declares RLF and starts another timer T311.

The second phase of RLF is recovery. During T311, the UE initiates RLF recovery and tries to connect to a suitable node 204 it sees via a contention-based random access procedure. If the UE cannot establish connection before the T311 timer expires, the UE goes back to RRC_IDLE (i.e. a call is dropped).

To aid with a successful RLF recovery, after receiving the CDR message, and acknowledging it as indicated at 1015 of flow diagram 1000, the non-anchor nodes 204-1 through 204-6 can transfer the UE contexts to the anchor cell 204-7 as the UEs are expected to connect to the anchor node when recovering from RLF as indicated at 1020 of flow diagram 1000. To reduce the service interruption, the value for timer T310 can be set to a small value, as low as 0. Once the anchor node 204-7 enters anchor mode functionality, as indicated at 1025 of flow diagram 1000, it can notify the non-anchor nodes 204 as indicated at 1030 of flow diagram 1000, such as by using a modified CU message, modified to include transmission power levels.

During the RLF recovery, namely after timer T310 expires, a UE 104 is expected to connect to the anchor node 204-7 as part of the handover indicated at 1035 of flow diagram 1000. To assist with the connection, a UE can be given the Cell-ID for anchor node 204-7 and the UE can give the anchor node 204-7 priority. If there is more than one anchor node, all of the anchor nodes could be given priority over non-anchor nodes. In variations, the anchor nodes to connect to can be ordered according to connection preference priority as well. If the UE cannot detect the prioritized anchor nodes it can then connect to the strongest node it sees.

To reduce the RLF service interruption time, the filter window time for Qout could be reduced from typically used values, for example, 200 msec, to a smaller value such as 100 msec, during the transition period.

To further reduce the RLF service interruption time, non-anchor nodes 204-1 through 204-6 could signal UEs 104 the anchor node's system information block (SIB) information such as Physical Random Access Channel (PRACH) configuration. In this case during RLF recovery when the UE connects to the anchor cell it doesn't have to spend time to read SIB information to get PRACH information. The UEs can also be signaled in accordance with a radio resource control protocol.

In another variation, the RLF may be avoided by a cell breathing technique. The anchor node may gradually reduce its transmission power, for example, CRS power by a pre-defined step in a pre-defined duration. The anchor node can configure some or all of the UEs being served by the anchor node to perform measurements. Nodes within the vicinity of the anchor node may adjust their transmission parameters to increase their transmission power, for example. When the UEs served by the anchor cell can determine an improved indicator such as an RSRP or RSRQ from the nodes in the vicinity in comparison with the indicators determined from the anchor node, the UEs can be scheduled to be handed over to the nodes in the vicinity with the improved indicators.

Once handover is complete, a non-anchor node 204 can enter ES-mode as indicated at 1040 of flow diagram 1000. The non-anchor nodes could notify the anchor node 204-7 about the entry into ES mode. The non-anchor nodes could so notify the anchor node via, e.g., the existing X2-AP CU message or a modified X2-AP CU message, modified to include transmission power levels, as indicated at 1045 of flow diagram 1000.

In another variation, the non-anchor nodes 204-1 through 204-6 could enter ES mode at approximately the same time as the anchor node 204-7 enters anchor mode, transmitting at full power for example. In this case, the UEs 104 served by non-anchor nodes can experience RLF. During RLF recovery, these UEs can connect to the anchor 204-7 which will typically be the strongest node they detect. The non-anchor nodes 204-1 through 204-6 can transfer UE contexts to the anchor cell in advance to enable successful RLF recovery. To reduce the service interruption, a small value, as low as 0, for timer T310 can be used. In addition, as the UEs 104 in the area go to RLF at the same time, to avoid Random Access Channel (RACH) congestion the anchor node 204-7 can allocate more PRACH resources during the transition period.

Figure 11:
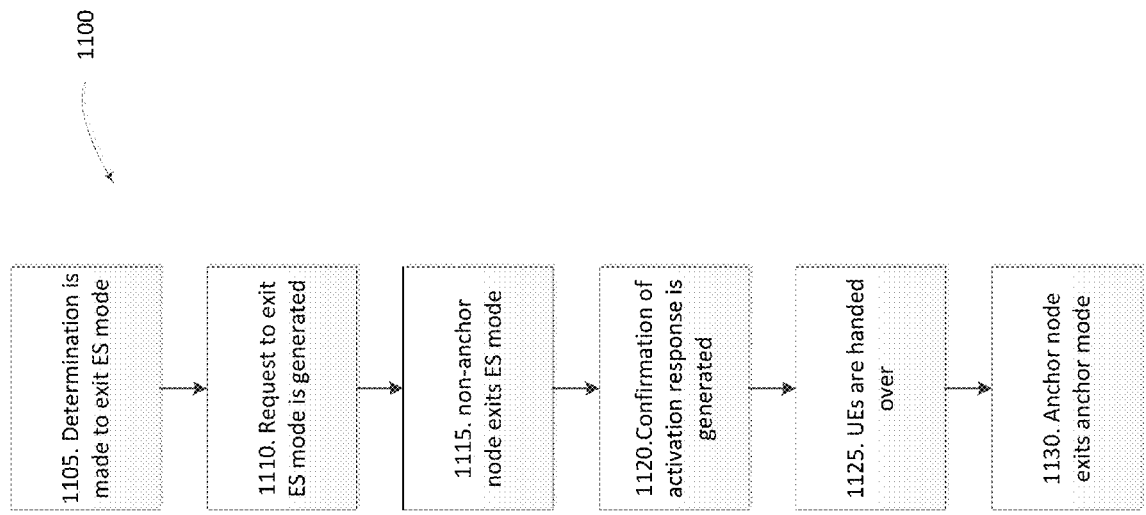
FIG. 11 shows a flow chart indicating an exemplary method of exiting an energy savings mode.

Once a non-anchor node is in an ES mode, it can subsequently be entered into a normal power mode as required, for example when the loading gets high for the anchor cell providing coverage for the non-anchor cell in the ES mode. Referring now to FIG. 11, a method for exiting ES mode is indicated at 1100. In order to assist in the explanation of the method, it'll be assumed that method 1100 is operated using system 100 as shown in FIG. 1 and area 212 as indicated in FIG. 5. Additionally, the following discussion of method 1100 leads to further understanding of system 100. However, it is to be understood that system 100, and method 1100 can be varied, and need not work exactly as discussed herein in conjunction with each other, and that such variations are within scope.

Referring now to method 1100, a determination is made to exit ES mode at 1105. Continuing with method 1100, at 1110 a request to exit ES mode is generated. The request can take the form of an X2-AP message. At 1115, one or more non-anchor nodes exit ES mode. Continuing with method 1100, at 1120, non-anchor nodes generate and transmit a confirmation of activation response. The confirmation can take the form of an X2-AP message. At 1125, the UE(s) are handed over. At 1130, anchor node exits anchor mode.

Figure 12:
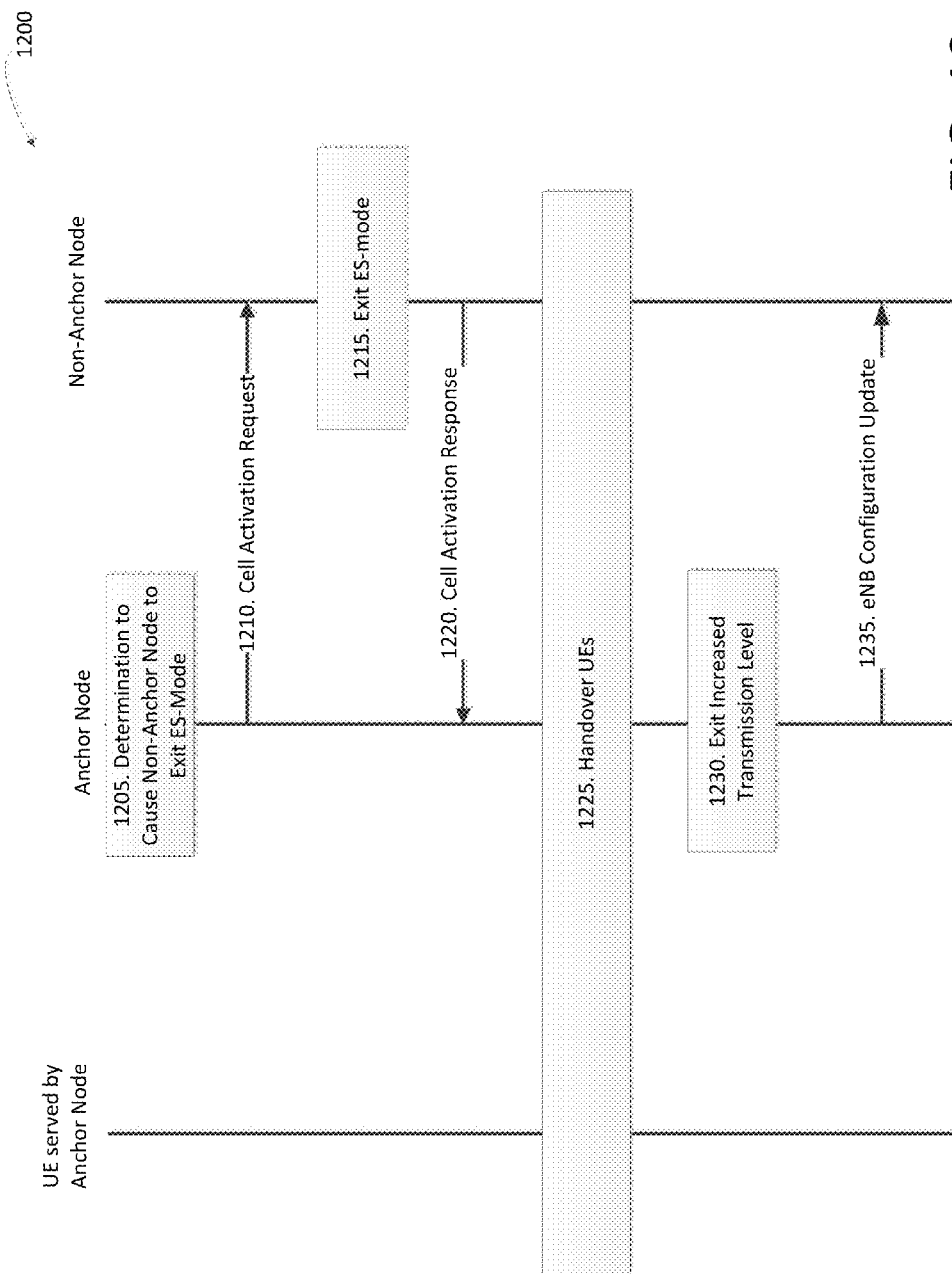
FIG. 12 shows a flow diagram indicating an exemplary method of exiting an energy savings mode.

Flow diagram 1200 indicated at FIG. 12, further illustrates the performance of method 1100. As a non-limiting illustrative example, it will be assumed that for area 212 as shown in FIG. 5, a configuration is used where node 204-7 is the anchor node, and nodes 204-1 through 204-6 are non-anchor nodes. Accordingly, in the present example, it is the non-anchor cells 204-1 through 204-6 that exit ES mode, and it is node 204-7 that exits anchor mode functionality.

Referring now to flow diagram 1200, as indicated in FIG. 12 a determination is made to exit ES mode at 1205. In the present example, it is the non-anchor cells 204-1 through 204-6 that will exit the ES mode. Moreover, in the present example, the decision to exit the ES mode is made by the anchor node 204-7 as indicated at 1205 of flow diagram 1200. In some implementations where there are multiple anchor nodes in an area 212, one anchor node could be the central coordinator to make the decision whether to exit the ES mode. In variations, the coordinator anchor node that makes the decision may not be the anchor node that will be exiting anchor mode to handover coverage for the nodes that exit ES mode.

The decision to exit ES mode can be based on information relating to area 212. When the anchor node 204-7 decides that the traffic amount in the area 212 gets sufficiently high, one or more of the non-anchor nodes can be made to exit ES mode.

In a variation, a non-anchor node such as 204-1 can initiate the decision to exit itself from ES mode, or alter the ES mode, based on its current determination of potential UEs 104 available for serving by its cell area 208-1. For example, in order to maintain some awareness of nearby UEs, the node 204-1 could maintain either the transmission or the reception functionality at least partially enabled by maintaining a TX or RX state of ES mode. For example, in the RX state where some reception functionality is maintained, the dormant node in the RX state can determine whether there are any UEs 104 nearby via monitoring UL signals. Alternatively, in the TX state where some transmission functionality is maintained, a powered down node 204 can be discovered by UEs 104 by having the powered down node 204 transmit, for example, low-density discovery signals. Accordingly, TX state and RX state may allow a non-anchor node 204 that has entered ES mode to nevertheless be able to assist in the collection of information regarding potential network load, and thus obtain information that can be part basis of a determination to exit ES mode. In another variation, when the active nodes determine that total needed throughput from the active UEs in an area or areas is close to the network limit, some nodes can be made to exit ES-mode in order to increase the network's total throughput.

Continuing with flow diagram 1200, at 1210 the anchor node 204-7 requests non-anchor nodes 204-1 through 204-6 to exit ES mode. In variations, an anchor node may request only some of the non-anchor nodes to exit ES mode.

In the present example, the request is in the form of a Cell Activation Request (CAR) X2-AP message in accordance with the LTE standard, and includes in the message an identifier, such as Cell-ID, of the node or nodes to activate. This X2-AP message can then be transmitted to the non-anchor nodes with the Cell-ID. In variations, a single CAR message can be sent to multiple non-anchor nodes. The message sent to the multiple non-anchor nodes can also be modified to include all of the non-anchor node's Cell-IDs in the message.

In other variations, the request can be transmitted to other nodes as needed. In further variations, where there are multiple anchor nodes, the message can be sent to other anchor nodes if they are to exit anchor mode in response to the non-anchor node exiting ES mode. In yet further variations where there are multiple anchor nodes providing coverage for a single non-anchor node, each anchor node that will release coverage to a non-anchor node as that non-anchor node exits ES mode can generate a separate CAR message and send it to the non-anchor node.

In some implementations, the CAR message can be modified to include additional information to assist with the transition from ES mode, e.g., as indicated in Table II. For example the message can include an indication of when the anchor node 204-7 will exit anchor mode by reducing power or switching to directional antenna mode. This could, accordingly, indicate the time for exiting ES mode at the non-anchor nodes 204-1 through 204-6. Having an indication of the time at which to exit ES mode can allow a non-anchor node 204 to determine when to increase its transmit power.

performed on the reserved resources for the UEs 104. In another variation, the anchor node can gradually reduce its CRS transmission power while at least some nodes in the vicinity of the anchor node gradually increase their transmission power by adjusting their transmission parameters.

Accordingly, the UEs served by the anchor node may be handed over to the nodes in the vicinity.

Other information that can be included with a modified CAR message to assist with the transition from ES mode will now occur to a person of skill in the art.

Continuing with flow diagram 1200, in the present example, non-anchor nodes 204-1 through 204-6 exit ES mode by, for example, adjusting transmission power and/or antenna tilt, and/or switching from directional antenna to omni-directional antenna mode as indicated at 1215.

At 1220 a response is sent by the non-anchor nodes 204-1 through 204-6. The response can be in the form of a cell activation response (CARes) X2-AP message in accordance with LTE standards, or a modified version, sent to confirm the non-anchor node activation. If the anchor node 204-7 trans-

TABLE II

Example modified CAR X2-AP message.

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Activate or send measurement feedback or transmit DL discovery signals | | 1 .. <maxCellineNB> | | | GLOBAL | reject |
|   ECGI | M | | 9.2.14 | | — | — |
|   Transmit transmit signal configuration | O | | | | | — |
|   Receive Signal Configuration | O | | | | | — |
|   Measurement report configuration | O | | | | | — |
|   Reserved resources | O | | | | | |

| Range bound | Explanation |
|---|---|
| maxCellineNB | Maximum no. nodes that can be served by an eNB. Value is 256. |

In one implementation, to allow all the neighboring nodes to receive the notification before the anchor node exits anchor mode, a guard time may be added to the time for exiting anchor mode or ES mode to account for backhaul delay.

The modified CAR message can also include an indication of resources to be reserved. In one implementation, non-anchor nodes 204-1 through 204-6 can exit the ES mode while the anchor node 204-7 is still in the anchor mode to facilitate the handover of the UE's 104 to the non-anchor nodes. After the non-anchor nodes 204-1 through 204-6 exit the ES mode but before the UEs 104 are handed over from the anchor cell 204-7, interference can be experienced.

To lessen the impact of interference, anchor node 204-7 can reserve some resources in time and/or frequency domain for low power or blank transmissions to maintain the radio link quality of the UEs 104. The reserved resources can be communicated through the modified CAR message. For example, the anchor node 204-7 could configure some almost blank subframes (ABSs). After the UEs 104 served by the anchor node 204-7 are handed over to the non-anchor nodes, the non-anchor nodes 204-1 through 204-6 may schedule the UEs 104 in the ABSs to avoid interference. Accordingly different measurements such as RLM, RRM and CQI, can be mits on a frequency that is different from the non-anchor cells 204-1 through 204-6, it could configure its UEs for inter-frequency measurement once it receives the CARes message from the non-anchor nodes.

Continuing with FIG. 12, after the non-anchor nodes 204-1 through 204-6 exit ES mode, the anchor node 204-7 can start handing over UEs 104 as indicated at 1225. To pick the appropriate target node for a UE 104, the parameter Cell Individual Offset in measurement configuration could be set as the power difference between the anchor node's low and high powers for non-anchor nodes 204-1 through 204-6. This allows a UE 104 to trigger an A3 event based on the anchor node's adjusted reference signal received power (RSRP) value to reflect the RSRP of low transmit power. Alternatively the anchor node could reduce its power gradually and the UEs 104 can be handed over based on A3 measurement reports.

After the UEs 104 are handed over to the non-anchor nodes 204-1 through 204-6, to avoid strong interference from the anchor node 204-7, the non-anchor nodes may schedule these UEs 104 on the reserved resources. The amount of reserved resources could be small at the beginning and may gradually increase as more UEs 104 are handed into non-anchor nodes 204-1 through 204-6.

Where the UEs 104 experience RLF after the non-anchor nodes exit ES mode or after the anchor node 204-7 exits anchor mode, the anchor node 204-7 may transfer contexts for the UEs 104 to the non-anchor nodes 204-1 through 204-6 in advance to facilitate RLF recovery. If the system knows the location of a UE 104, for example through GPS signaling or triangulation, the context of the UE 104 can be sent to the non-anchor nodes 204 in the vicinity of the UE 104's location.

Once the anchor node 204-7 hands over the UEs 104 to non-anchor nodes 204-1 through 204-6, it exits anchor mode as indicated at 1230 of flow diagram 1200.

After the anchor node exits the anchor power mode, the anchor and non-anchor nodes 204 can use all the resources. The anchor node 204-7 can send a modified CU X2-AP message to notify that it has exited anchor mode, the modified message including the transmit power level of the anchor node 204-7 as indicated at 1235 of flow diagram 1200. After receiving the modified CU X2-AP message, the non-anchor nodes 204-1 through 204-6 can use the reserved resources. Alternatively, the non-anchor nodes 204-1 through 204-6 could be aware of the low power transmission level of the anchor node 204-7 via a network listening function (i.e. the non-anchor nodes 204 can have UE functionality and may monitor the signal strength of anchor node 204-7).

Figure 13:
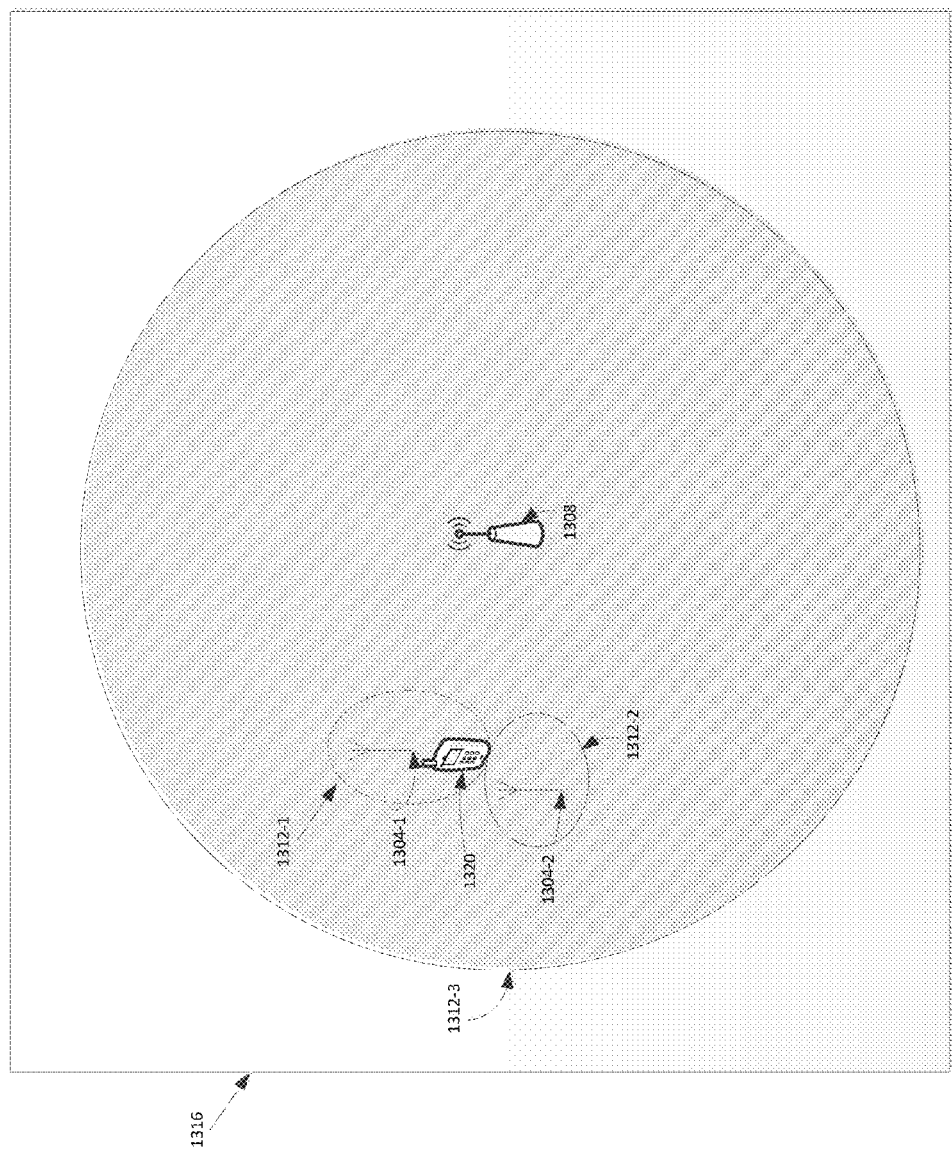
FIG. 13 shows a block diagram of an area in accordance with an aspect of a wireless system for energy saving.

In some implementations, network densification may be achieved by the deployment of complementary low-power nodes under the coverage of a macro-node layer as indicated in FIG. 13. In such a heterogeneous deployment, low-power or small nodes, such as piconodes and femtonodes, are indicated at 1304-1 and 1304-2 provide very high end-user throughput for a small area, such as in indoor and hot-spot outdoor areas. Collectively, small nodes 1304-1 and 1304-2 are referred to as small nodes 1304, and generically as small node 1304. This nomenclature is used elsewhere herein. A macro node 1308, on the other hand provides coverage for the full area 1316. Cells 1312-1 and 1312-2 are the cell areas served by small nodes 1304-1 and 1304-2 respectively. In this example, it is assumed that node 1304-1 is in ES mode. Accordingly, cell 1312-1 is shown using dashed lines to indicate the cell boundaries that would be served by node 1304-1 if it was to enter normal mode. Cell 1312-3 is the cell area controlled by macro node 1308. In variations there can be multiple macro nodes in an area 1316.

In some implementations of small nodes 1304 with macro node 1308 coverage that is indicated in FIG. 13, when the traffic loading gets high in area 1316, the macro node 1308 as well as the small nodes 1304 may be active. When the traffic loading gets low, in one implementation only the macro node 1308 may be active and one or more of the small nodes 1304 may enter ES mode. The macro node 1308 and the small nodes 1304, when active, may be on the same or different frequencies.

Entry of small node 1304-1 into ES-mode can be based on node load. When the loading on a small node 1304-1 gets low, for example, the small node 1304-1 can instruct the UE 1320 it is serving to perform measurement reporting. Based on the measurement reports, the small node 1304-1 can determine one or more appropriate target nodes for handover, which can be a neighboring small node 1304-2 or the macro node 1308. Once all of the UEs served by node 1304-1, in this case UE 1320, are handed over, the small node 1304-1 can enter ES mode and send a CU X2-AP message to neighboring nodes to inform of the deactivation. In some implementations, the CU X2-AP message can be modified to include an indication of the ES state the node entered. The Handover Request message from the small node 1304-1 can include the appropriate reason, "Switch off ongoing" which can be supported by system 100 in accordance with LTE standards. In some implementations, entry into ES-mode be may based on additional factors such as the UE distribution, overall data rate used and others that will now occur to a person of skill in the art. For example, when there are UEs being served by a node utilizing low to medium data rate, some nodes may be entered into ES-mode while certain other nodes may enter anchor mode, thus allowing for all UEs to be served while achieving overall energy savings.

In some implementations, the decision to enter a small node 1304-1 into ES mode can be made by the macro node 1308, based on the information exchanged on X2-AP messaging such as cell resource usage. The macro node 1308 can request one or more small nodes 1304 to turn off by sending a CDR message. The CDR message may include the ES state that the macro node requests the small node to enter. The small node 1304-1 receiving the CDR message can hand over the UEs served by it and enters ES mode in accordance with one of the ES states described above. In some ES states, the small node 1304-1 can still monitor the UL transmissions if instructed by the neighboring nodes such as the macro node 1308 despite being in ES mode.

In some implementations, UE 1320 served by a small node 1304-1 is dual-connected to both the macro node 1308 (not shown) and the small node 1304-1. For example, the UE 1320 can be connected to the small node 1304-1 on the user plane (U-plane) and macro node 1308 on the control plane (C-plane). When the loading on the small node 1304-1 gets low, the small node 1304-1 can signal the macro cell 1308.

As the UE 1320's C-plane is anchored at macro cell 1308, the macro cell 1308 can instruct the UE 1320 to send a measurement report. In variations where there is another small node 1304, such as node 1304-2 in this example, based on the measurement report, the macro node 1308 can pick the small node 1304-2 to handover the UE 1320's U-plane. Macro node 1308 can then remove the small node 1304-1 from the UE 1320. Alternatively, the small node 1304-1 can reduce power gradually, causing the UE 1320 to trigger an A3 measurement report and the system 100 can proceed with the handover in accordance with usual methods.

After the small node 1304-1 enters ES mode, if the load for the macro node 1308 gets high, the macro node 1308 can cause the powered down small node 1304-2 to exit ES mode. In variations where there is more than one small node 804, if the load on one of the additional small nodes 1304, such as node 1304-2 gets high, that small node can also cause its neighboring dormant small cell 1304-1 to turn on. Hereinafter a node, whether macro or small, seeking to cause node 1304 to exit ES state so as to hand over at least some UEs it is serving will be referred to as a serving node.

To determine if any of the UEs that can be handed over are located around small node 1304-1, the serving node can request small node 1304-1 to enter RX state of ES mode. Accordingly, small node 804-1 can monitor UL signal strength such as UL interference over thermal noise (IoT) level or UL surrounding reference signal (SRS) signal strength. Although high IoT or SRS level serves a good indication that there might be some UEs around a small node 1304-1, such information is not definitively indicative of the number of UEs near the small node 1304-1. This is because a high IoT level could be due to one single UE that is close to the small node 1304-1 or could be due to multiple but father away UEs. Similarly, a high SRS signal strength may be indicative of a UE close to the small node 1304-1 and also of a UE that is at the macro node 1308 edge and transmitting at a high power.

To more definitively determine the availability of UEs around the small node 1304-1, a serving node 1308 or 1304-2 could request that the small node 804 turn on partially by sending low density control signals, such as density reduced CRS, Primary Synchronization Signal (PSS), Secondary Synchronization Signal (SSS), or other discovery signals. The UEs could measure the small node 1304 based on the low density control signals and feedback measurement results. If enough UEs report the small node 1304-1, the serving node can request that the small node 1304 fully turn on. If the number of UEs reporting the small node 1304 are below a threshold, the serving node can request the small node 1304-1 to go to the off state. Sending low-density discovery signal and asking UEs to measure can also be used for verifying the DL link quality. In variations, the radio environment could be different on UL and DL. For example, the UE may experience good link quality on UL but not on DL.

In some implementations, due to the potential Physical Cell ID (PCI) confusion where for example, due to a large number of small nodes deployed, small nodes can reuse PCI, the small node 1304-1, when in TX state may also transmit some basic system information such as SIB that includes cell identity information. The UE may include cell identity information in the measurement report to uniquely identify a node.

Figure 14:
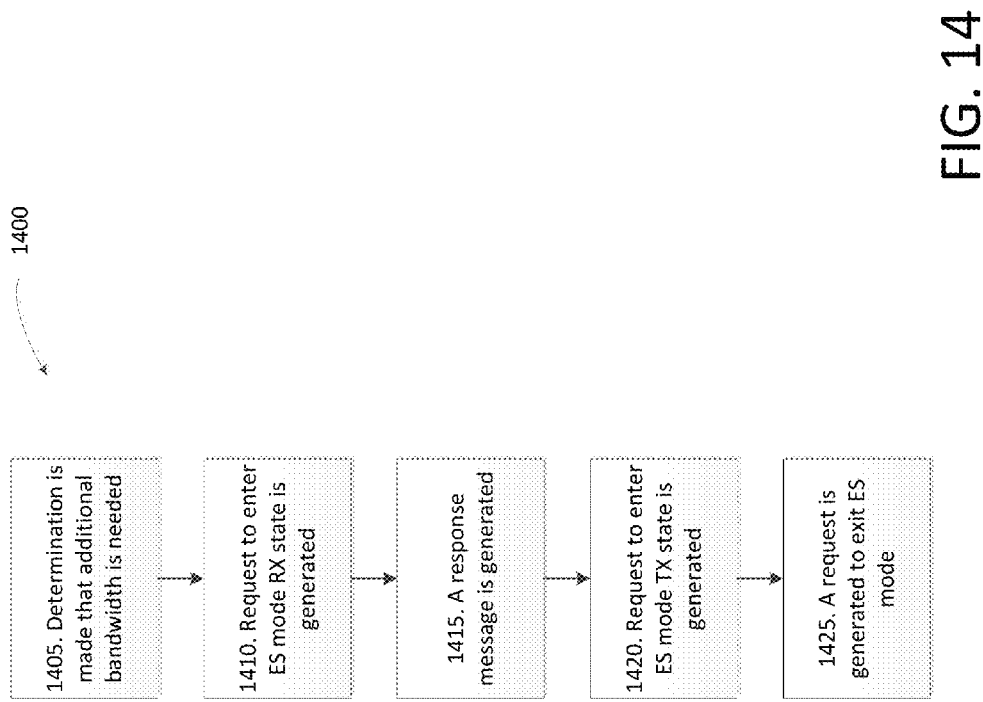
FIG. 14 shows a flow chart indicating an exemplary method of exiting energy savings mode for a small node.

Referring now to FIG. 14, a method for exiting ES mode for a small node is indicated at 1400. In order to assist in the explanation of the method, it will be assumed that method 1400 is operated using system 100 as shown in FIG. 1 and area 1316 as indicated in FIG. 13. As a non-limiting illustrative example, it'll be assumed that for area 1316 as shown in FIG. 13, node 1304-1 is in ES or dormant mode and node 1304-2 and 1308 are active. Moreover, it is assumed that UE 1320 is being served by serving node 1308. Additionally, the following discussion of method 1400 leads to further understanding of system 100. However, it is to be understood that system 100, and method 1400 can be varied, and need not work exactly as discussed herein in conjunction with each other, and that such variations are within scope.

Referring now to method 1400, a determination is made that additional bandwidth is needed at 1405. In one implementation, a serving node periodically evaluates network load and assess the need for additional bandwidth. If there is a need for additional bandwidth, the serving node can initially try to perform load balancing. For example, the serving node can determine whether the UEs being served by it can get acceptable quality of service when associated with the other active nodes. If the demand for the bandwidth can't be met after load balancing, nodes in ES-mode can be caused to exit from ES mode.

Continuing with method 1400, at 1410 a request to change ES mode state to RX state is generated. The request can be in the form of an X2-AP message. For example, a modified CAR message, as shown in Table II can include transmit signal configuration, receive signal configuration as well as measurement report configuration, allowing the CAR to be used for requesting a node in ES mode to enter TX state (TxonRxoff where transmission functionality is on, reception functionality is off) or RX state (TxoffRxon where transmission functionality is off and reception functionality is on), or the state where both transmission and reception functionality are on as well as causing that node to monitor reference signals and send measurement reports, and perform other tasks based on the ES mode state that will now occur to a person of skill.

For example, a field "Receive" can be used in the modified CAR message to specify the UL signal configuration and the measurement that small node should perform. Accordingly, a sub field "Signal Configuration" associated with the field "Receive" could be set to IoT if IoT is to be measured. Alternatively, this field can be set to SRS configuration if SRS is to be measured. Furthermore, a field "measurement report configuration" can specify the type of measurement to perform and report. For example, the field can indicate IoT or SRS threshold for report triggering, or filtering window length/filter coefficients to be used when averaging IoT or SRS signal quality.

Continuing with method 1400, at 1415, a response message is generated. The response message can be in the form of an X2-AP message. In variations, by performing 1415, inactive nodes around UEs can be identified when system 100 has no location information.

At 1420, a request to change ES mode state to TX state is generated. The request can be in the form of an X2-AP message. Continuing with method 1400, at 1425, a request is generated for the dormant node to exit from ES mode. The request can be in the form of an X2-AP message.

In a variation of method 1400, performance of 1410, namely requesting a dormant node to enter RX state and perform UL measurements, can be omitted. Accordingly, if the serving node does not have UE location information, a macro node 1308 can request some or all inactive nodes within its coverage to send a low-density discovery signal and ask some or all UEs to perform measurements on that basis. In a further variation, where the serving node is a small node, for example node 1304-2, the small node can ask some or all of its neighboring inactive cells, in this case small node 1304-1, to send a low-density discovery signal and ask some or all UEs to perform measurements on that basis. In a variation where the serving node has UE location information, the serving node can request selective nodes around UEs to send a low power discovery signal based on the location information.

In some implementations, the dormant node, such as node 1304-1 can always be in a TX state, transmitting low-density discovery signal for UEs to discover and/or always be in an RX state and monitor UL signal. In variations, the dormant node can also make the decision or recommendation to exit ES mode by itself and let the macro node 1308 know the decision or recommendation. If the macro node 1308 and the dormant node 1304-1 are on the same frequency, the macro node 1308 may reserve some resources, such as, ABS, to reduce the interference to the small cells.

Figure 15:
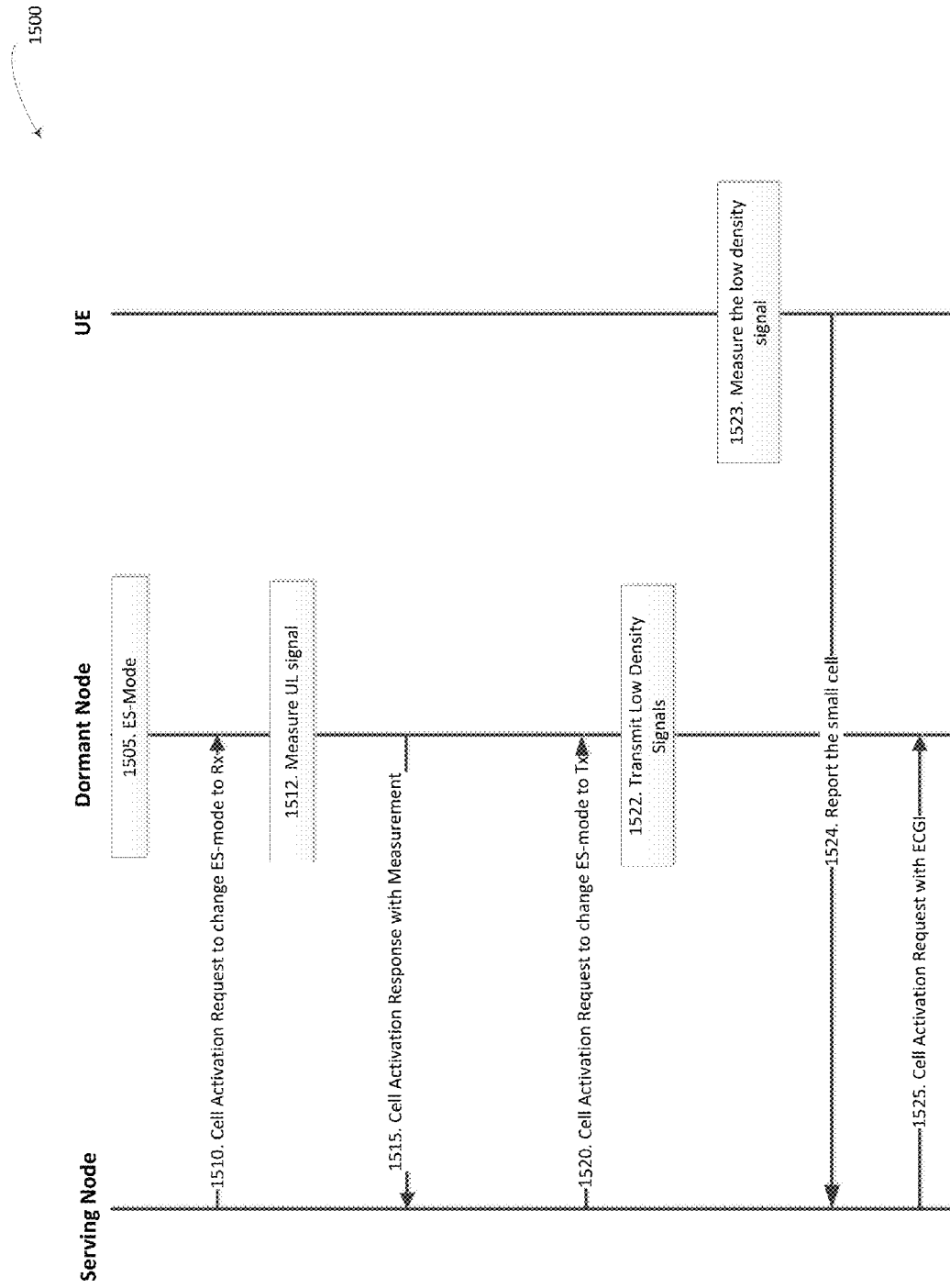
FIG. 15 shows a flow diagram indicating an exemplary method of exiting energy savings mode for a small node.

Flow diagram 1500 indicated at FIG. 15, further illustrates the performance of method 1400. As a non-limiting illustrative example, it'll be assumed that for area 1316 as shown in FIG. 13, small node 1304-1 is in ES or dormant mode and node 1304-2 and 1308 are active. Moreover, it is assumed that UE 1320 is being served by serving node 1308.

Continuing with the present example, a modified CAR message is sent by the serving node 1308 to dormant node 1304-1 to request an inactive cell to enter RX state and to measure IoT. In a variation, the serving node can request small node 1304-1 to measure the UL signal quality from UEs. The serving node can share the configuration of the special sequences which are transmitted by its RRC_connected UEs with dormant node 1304-1. For example, the special sequences can be SRS sequences which are transmitted by the UEs periodically or aperiodically. The configuration of the special sequence may be signaled to the UE from the serving node via an instructing message such as an RRC message so that the UE could transmit accordingly. The configuration may include the parameters for sequence generation, the time duration and periodicity of the sequence transmission, the uplink radio resources to transmit the sequence, transmission power etc. . . . Alternatively, a UE may be requested to transmit the special sequences at a fixed power (e.g. SRS at a fixed power) so that more accurate information can be obtained on how close the UE is to the small node 1304-1. The small node 1304-1 can subsequently send the UL measurement reports to the serving node.

If the serving node knows the locations of the inactive nodes, such as node 1304-1, as well as the locations of its UEs, the serving node can select the UEs close to the dormant node 1304-1, for example and send their SRS configurations to node 1304-1, requesting node 1304-1 to monitor. The serving node can obtain the UE location via either UE GPS or UE positioning schemes such as Observed Time Difference of Arrival (OTDOA) or Uplink Time Difference of Arrival (UTDOA) in accordance with LTE standards, and other methods which will now occur to a person of skill.

In the present example, small node 1304-1 generates a response message as indicated at 1515 of flow diagram 1500, including measurement reports which were generated in response to the request message as indicated at 1512 of flow diagram 1500. A modified CARes X2-AP message can be used to convey the reports. For example, the modified CARes message can include one or more fields for conveying reports or measurement results. Accordingly, small node 1304-1 sends a modified CARes X2-AP message to the serving node, the message containing the measurement reports on UL signal.

Continuing with flow diagram 1500, at 1520, a modified CAR message is sent by the serving node to small node 1304-1 to request that the node to enter TX state. The dormant node is accordingly instructed to send a low density discovery signal as indicated at 1522 of flow diagram 1500. A field "Transmit" can be included in the message, as indicated in Table II for example, that can indicate the configuration of the DL discovery signal. The configuration of the DL discovery signal may be signaled to the UE from the serving node via an RRC or SIB message.

The UE could measure the discovery signal as indicated at 1523 of flow diagram 1500 and report a dormant node to the serving node via measurement reports if certain criteria are met as indicated at 1524. The UE measurement configuration (i.e. how the UE performs measurements on discovery signal) can be signaled to the UE via RRC or SIB message. The measurement configuration may include the quantity to measure, filtering parameters such as window length etc. . . . The criteria for the UE to trigger measurement reports may also be signaled to the UE via RRC or SIB message, e.g., the threshold of the received discovery signal strength for the UE to report a dormant node.

If dormant node reports a high IoT value or high UL signal strength, the serving cell can ask the small node 1304-1 to transmit intermittent reference signals (i.e. low-density discovery signal), such as PSS/SSS, CRS, or reduced density CRS (CRS transmitted once every few subframes) on selected carrier frequencies. The transmit power level can be recommended by the serving node as part of the modified CAR X2-AP message. The configuration of the low density discovery signal can also be signaled to UE 1320 via, for example, Radio Resource Control (RRC) so that the UE 820 can perform measurements. The UE 1320 can be configured to perform measurements on the discovery signal. These measurements are sent back to the serving node.

If the serving node determines there to be a number of UEs greater than a threshold number reporting small node 1304-1, the serving node can request the small node 1304-1 to exit ES mode as indicated at 1525 of flow diagram 1500. The request can be in the form of an X2-AP CAR message utilizing for example an ECGI field.

The above-described implementations are intended to be examples and alterations and modifications may be effected thereto, by those of skill in the art, without departing from the scope which is defined solely by the claims appended hereto.

We claim:

1. A method performed at a network node for entering into an energy saving mode comprising:
   receiving a request message from an anchor node requesting entry of said network node into said energy saving mode;
   sending an acknowledgement message in response to said request message; and
   entering said energy saving mode.

2. The method of claim 1 wherein entering said energy saving mode comprises putting said network node into an energy saving mode state, said energy saving mode state being one of: reception off and transmission on state; reception on and transmission off state; or reception off and transmission off state.

3. The method of claim 2, wherein putting said network node into reception on transmission off state further comprises receiving signals transmitted by a user equipment (UE) associated with said anchor node, said signals being specific to said UE.

4. The method of claim 2, wherein putting said network node into reception off transmission on state further comprises broadcasting network node specific signals at regular intervals.

5. The method of claim 1 wherein said request message includes at least one of an indication of time of entry of an anchor node into anchor mode or an indication of an energy saving mode state.

6. The method of claim 1 wherein said request message includes an indication of radio resources to be reserved, said method further comprising:
   scheduling user equipment served by said network node on said indicated reserved resources prior to user equipment handover.

7. The method of claim 1 further comprising:
   receiving, prior to said entering, an X2-Application Protocol message indicating an adjustment of transmission parameters of said anchor node.

8. The method of claim 7, wherein said transmission parameters comprise at least one of transmission power level, antenna type or antenna tilt.

9. The method of claim 7 wherein said X2-Application Protocol message is an eNB Configuration Update message modified to include an indicator for transmission parameters.

10. The method of claim 1 further comprising:
    sending, after said entering, an X2-Application Protocol message indicating an adjusted transmission parameter of said network node.

11. The method of claim 10 wherein said X2-Application Protocol message is an eNB Configuration Update message modified to include an indicator for transmission parameters.

12. The method of claim 1 further comprising:
    providing an identifier of said anchor node to a user equipment served by said network node.

13. The method of claim 1 further comprising:
    transferring to said anchor node contexts for user equipment served by said network node.

14. The method of claim 1 further comprising:
    obtaining anchor node information from one or more of Operations, Administration and Management (OAM) or Self-Organized Network (SON).

15. A method performed at a network node for exiting an energy saving mode comprising:

receiving a request message to exit said energy saving mode;

responsive to said receiving, exiting said energy saving mode; and generating an acknowledgement message in response to said request message, wherein said request message includes one or more of an indication of time of adjusting transmission parameters at an anchor node, an indication of resources to be reserved, or an indication of the energy saving mode state.

16. The method of claim 15 further comprising:

receiving an X2-Application Protocol message indicating said adjusted transmission parameters of an anchor node.

17. The method of claim 16 wherein said X2-Application Protocol message is an eNB Configuration Update message modified to include an indicator for transmission parameters.

18. A method performed at an anchor node for increasing a cell area served by said anchor node, said method comprising:

sending a request message to a network node requesting said network node enter into an energy saving mode;

receiving an acknowledgement message in response to said request message; and adjusting transmission parameters to increase said cell area.

19. The method of claim 18 wherein said request message includes at least one of an indication of time of adjusting transmission parameters, an indication of resources to be reserved or an indication of the energy saving mode state.

20. The method of claim 18 further comprising:

sending, after said entering, an X2-Application Protocol message indicating said adjusted transmission parameters.

21. The method of claim 20 wherein said X2-Application Protocol message is an eNB Configuration Update message modified to include an indicator for adjusted transmission parameters.

22. The method of claim 18 further comprising:

receiving, after said adjusting, an X2-Application Protocol message indicating adjusted network node transmission parameters of said network node.

23. The method of claim 22 wherein said X2-Application Protocol message is an eNB Configuration Update message modified to include an indicator for adjusted network node transmission parameters.

24. The method of claim 18, wherein said transmission parameters comprise at least one of transmission power level, antenna type or antenna tilt.

25. A method performed at an anchor node for decreasing a cell area served by said anchor node, said method comprising:

sending a request message to a network node requesting said network node exit from an energy saving mode;

receiving an acknowledgement message in response to said request message; and adjusting transmission parameters to decrease said cell area.

26. The method of claim 25 wherein said request message includes at least one of an indication of time of adjusting said transmission parameters or an indication of the energy saving mode state.

27. The method of claim 26 wherein said request message includes an indication of resources to be reserved, said method further comprising:

scheduling user equipment served by said anchor node on said indicated reserved resources prior to user equipment handover.

28. The method of claim 25 further comprising:

sending, after said exiting, an X2-Application Protocol message indicating said adjusted transmission parameters at said anchor node.

29. The method of claim 28 wherein said X2-Application Protocol message is an eNB Configuration Update message modified to include an indicator for said adjusted transmission parameters.

30. The method of claim 25, wherein said transmission parameters comprise at least one of transmission power level, antenna type or antenna tilt.

31. A network node comprising:

a communications interface operating to:
receive a request message from an anchor node requesting entry of said network node into said energy saving mode;
send an acknowledgement message in response to said request message; and a processing unit operating to:
enter said network node into an energy saving mode in response to said request message.

32. The network node of claim 31 wherein said processing unit operating to enter said energy saving mode further comprises:

said processing unit further operating to put said network node into an energy saving mode state, said energy saving mode state being one of: reception off and transmission on state; reception on and transmission off state; or reception off and transmission off state.

33. The network node of claim 32, wherein when said network node enters into said reception on transmission off state, said communications interface further operates to receive signals transmitted by a user equipment (UE) associated with said anchor node, said signals being specific to said UE.

34. The network node of claim 32, wherein when said network node enters into said reception off transmission on state, said communications interface further operates to broadcast network node specific signals at regular intervals.

35. The network node of claim 31 wherein said request message includes at least one of an indication of time of entry of an anchor node into anchor mode or an indication of an energy saving mode state.

36. The network node of claim 31 wherein said request message includes an indication of radio resources to be reserved, said processing unit further operating to:

schedule user equipment served by said network node on said indicated reserved resources prior to user equipment handover.

37. The network node of claim 31, said communications interface further operating to:

receive, prior to said network node entering into said energy saving mode, an X2-Application Protocol message indicating an adjustment of transmission parameters of said anchor node.

38. The network node of claim 37, wherein said transmission parameters comprise at least one of transmission power level, antenna type or antenna tilt.

39. The network node of claim 37 wherein said X2-Application Protocol message is an eNB Configuration Update message modified to include an indicator for transmission parameters.

40. The network node of claim 31, said communications interface further operating to:

send, after said network node entering into said energy saving mode, an X2-Application Protocol message indicating an adjusted transmission parameter of said network node.

41. The network node of claim 40 wherein said X2-Application Protocol message is an eNB Configuration Update message modified to include an indicator for transmission parameters.

42. The network node of claim 31, said communications interface further operating to:
provide an identifier of said anchor node to a user equipment served by said network node.

43. The network node of claim 31, said communications interface further operating to:
transfer to said anchor node contexts for user equipment served by said network node.

44. The network node of claim 31, said processing unit further operating to:
obtain anchor node information from one or more of Operations, Administration and Management (OAM) or Self-Organized Network (SON).

45. A network node comprising:
a communications interface operating to:
receive a request message to exit said energy saving mode;
generate an acknowledgement message in response to said request message; and
a processing unit operating to:
responsive to said receiving, exit said energy saving mode,
wherein said request message includes one or more of an indication of time of adjusting transmission parameters at an anchor node, an indication of resources to be reserved, or an indication of the energy saving mode state.

46. The network node of claim 45, the communications interface further operating to:
receive an X2-Application Protocol message indicating said adjusted transmission parameters of an anchor node.

47. The network node of claim 46 wherein said X2-Application Protocol message is an eNB Configuration Update message modified to include an indicator for transmission parameters.

48. An anchor node comprising:
a communications interface operating to:
send a request message to a network node requesting said network node enter into an energy saving mode; and
receive an acknowledgement message in response to said request message; and
a processing unit operating to:
adjust transmission parameters to increase a cell area served by the anchor node.

49. The anchor node of claim 48 wherein said request message includes at least one of an indication of time of adjusting transmission parameters, an indication of resources to be reserved or an indication of the energy saving mode state.

50. The anchor node of claim 48, said communications interface further operating to:
send, after said entering, an X2-Application Protocol message indicating said adjusted transmission parameters.

51. The anchor node of claim 50 wherein said X2-Application Protocol message is an eNB Configuration Update message modified to include an indicator for adjusted transmission parameters.

52. The anchor node of claim 48, said communications interface further operating to:
receive, after said transmission parameters are adjusted, an X2-Application Protocol message indicating adjusted network node transmission parameters of said network node.

53. The anchor node of claim 52 wherein said X2-Application Protocol message is an eNB Configuration Update message modified to include an indicator for adjusted network node transmission parameters.

54. The anchor node of claim 48, wherein said transmission parameters comprise at least one of transmission power level, antenna type or antenna tilt.

55. An anchor node comprising:
a communications interface operating to:
send a request message to a network node requesting said network node exit from an energy saving mode;
receive an acknowledgement message in response to said request message; and
a processing unit operating to:
adjust transmission parameters to decrease a cell area served by said anchor node.

56. The anchor node of claim 55 wherein said request message includes at least one of an indication of time of adjusting said transmission parameters or an indication of the energy saving mode state.

57. The anchor node of claim 56 wherein said request message includes an indication of resources to be reserved, said processing unit further operating to:
schedule user equipment served by said anchor node on said indicated reserved resources prior to user equipment handover.

58. The anchor node of claim 55, said communications interface further operating to:
send, after said exiting, an X2-Application Protocol message indicating said adjusted transmission parameters at said anchor node.

59. The anchor node of claim 58 wherein said X2-Application Protocol message is an eNB Configuration Update message modified to include an indicator for said adjusted transmission parameters.

60. The anchor node of claim 55, wherein said transmission parameters comprise at least one of transmission power level, antenna type or antenna tilt.

* * * * *

UNITED STATES PATENT AND TRADEMARK OFFICE
CERTIFICATE OF CORRECTION

PATENT NO. : 8,917,668 B1
APPLICATION NO. : 13/911926
DATED : December 23, 2014
INVENTOR(S) : Yi Song et al.

Page 1 of 3

It is certified that error appears in the above-identified patent and that said Letters Patent is hereby corrected as shown below:

On the title page
Item 57 In the Abstract: delete "serving" and insert --saving mode--
In the drawings
FIG. 7: delete "achnowledged" and insert --acknowledged--
In the specification
Column 2, line 42: "of claim" should be deleted
Column 2, line 52: insert --,-- in between "aspect" and "a"
Column 3, line 4: insert --,-- in between "aspect" and "a"
Column 4, line 28: insert --,-- in between "aspect" and "a"
Column 5, line 10: insert --,-- in between "aspect" and "a"
Column 5, line 42: insert --,-- in between "aspect" and "a"
Column 6, line 24-25: delete "comprising" and insert --is provided. The eleventh method can comprise--
Column 9, line 43: insert --104-- after first instance of "UEs"
Column 9, line 60: insert --,-- after "case" and delete "," after "204-7"
Column 9, line 63: insert --area-- after first instance of "cell"
Column 10, line 25: delete "208" and insert --208-- after "area"
Column 10, line 67: "can't" should be changed to --cannot--
Column 10, line 67: delete "of"
Column 11, line 34: "make sure" should be changed to --ensure--
Column 12, line 61: "it'll" should be changed to --it will--
Column 13, line 14: insert --,-- after "710"
Column 13, lines 16-18: delete "The request can take the form of an X2-AP message in accordance with LTE standards"
Column 14, line 5: "UE's" should be changed to --UEs--
Column 16, line 20: delete the "," after "by"
Column 16, line 22: insert --mode-- after second instance of "antenna"
Column 16, line 41: delete the "," after "be"
Column 17, line 10: delete "implementation" and insert --implementations,--

Signed and Sealed this
Twentieth Day of October, 2015

Michelle K. Lee
*Director of the United States Patent and Trademark Office*

CERTIFICATE OF CORRECTION (continued)
U.S. Pat. No. 8,917,668 B1

In the specification

Column 17, line 42: delete "area"
Column 18, line 16: delete "cell" after "anchor" and insert --node-- after "anchor"
Column 18, line 30: insert --208-- after "cell"
Column 18, line 41: delete "," after "by"
Column 18, line 42: insert --antenna mode-- after "directional"
Column 18, line 64: delete "node" and insert --nodes-- after anchor
Column 18, line 65: insert --through 204-6-- after "204-1"
Column 19, line 5: delete "node's" and insert --node 204-7's--
Column 19, line 6: delete "node's" and insert --node 204-7's--
Column 19, line 9: insert --104-- after "UEs"
Column 19, line 25: delete "implementation" and insert --implementations--
Column 19, line 58: delete "area"
Column 21, line 10: delete "doesn't" and insert --does not--
Column 21, line 22: delete "cell" and insert --node--
Column 21, line 40: insert --node-- after "anchor"
Column 21, line 43: delete "cell" and insert --node--
Column 21, line 52: delete "cell" and insert --node--
Column 21, line 55: delete "it'll" and insert --it will--
Column 22, line 9: delete "cell" and insert --node--
Column 22, line 16: delete "cell" and insert --node--
Column 23, line 56: delete "cell" and insert --node--
Column 24, line 14: insert --mode-- after "antenna"
Column 24, line 44: delete "cell" and insert --node--
Column 25, line 30: delete "are" and insert --as--
Column 26, line 3: delete "be may" and insert --may be--
Column 26, line 30: delete "cell" and insert --node--
Column 26, line 31: delete "cell" and insert --node--
Column 26, line 32: delete "cell" and insert --node--
Column 26, line 45 delete "804" and insert --1304--
Column 26, line 48: delete "cell" and insert --node--
Column 26, line 55: delete "804-1" and insert --1304-1--
Column 26, line 58: insert --a-- after "Although"
Column 26, line 63: delete "father" and insert --farther--
Column 27, line 3: delete "804" and insert --1304--
Column 27, line 29: delete "it'll" and insert --it will--
Column 27, line 41: delete "assess" and insert --assesses--
Column 27, line 46: delete "can't" and insert --cannot--
Column 28, line 28: delete "cells" and insert --nodes--
Column 28, line 43: delete "cells" and insert --nodes--
Column 28, line 46: delete "it'll" and insert --it will--
Column 28, line 48: delete "node" and insert --nodes--
Column 28, line 52: delete "cell" and insert --node--
Column 29, line 29: delete "to enter" and insert --enters--

CERTIFICATE OF CORRECTION (continued)
U.S. Pat. No. 8,917,668 B1

In the specification

Column 29, line 50: delete "cell" and insert --node--

Column 29, line 58: delete "820" and insert --1320--

In the claims

Column 33, line 1: delete "entering" and insert --enters--